US010146823B2

(12) United States Patent
Kitajima et al.

(10) Patent No.: US 10,146,823 B2
(45) Date of Patent: Dec. 4, 2018

(54) RELEVANT-INFORMATION PROVIDING METHOD, RELEVANT-INFORMATION PROVIDING APPARATUS, AND RELEVANT-INFORMATION PROVIDING PROGRAM

(71) Applicant: FUJITSU LIMITED, Kawasaki (JP)

(72) Inventors: Shinya Kitajima, Shinagawa (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 14/990,427

(22) Filed: Jan. 7, 2016

(65) Prior Publication Data

US 2016/0224332 A1 Aug. 4, 2016

(30) Foreign Application Priority Data

Jan. 30, 2015 (JP) ................................ 2015-016599

(51) Int. Cl.
*G06F 9/44* (2018.01)
*G06F 17/30* (2006.01)
*G06F 8/658* (2018.01)

(52) U.S. Cl.
CPC ........ *G06F 17/30368* (2013.01); *G06F 8/658* (2018.02)

(58) Field of Classification Search
CPC .. G06F 17/3023; G06F 17/30309; G06F 8/68; G06F 8/70; G06F 8/71; G06F 8/77
See application file for complete search history.

(56) References Cited

U.S. PATENT DOCUMENTS

2002/0053012 A1* 5/2002 Sugimoto ........... G06F 11/3006 712/1
2005/0166094 A1* 7/2005 Blackwell ........... G06F 11/3664 714/38.14
2006/0130040 A1* 6/2006 Subramanian ............ G06F 8/65 717/168
2008/0051921 A1 2/2008 Nammatsu
2010/0153908 A1* 6/2010 Sarkar .................... G06Q 10/00 717/104

(Continued)

FOREIGN PATENT DOCUMENTS

JP 2008-021111 1/2008
JP 2011-248658 12/2011

*Primary Examiner* — Duy Khuong T Nguyen
(74) *Attorney, Agent, or Firm* — Fujitsu Patent Center

(57) ABSTRACT

A relevant-information providing method comprising in response to update of an application carried out in a system, storing, in a storage, difference information that is a difference between information on the application that has not been updated and information on the application that has been updated and modification information on management of the system modified as a result of the update, in response to acquisition of update information on a first application, extracting, from the stored difference information, a piece of difference information that is in a predetermined similarity relation with first difference information that is a difference between information on the first application that has not been updated and information on the first application that has been updated, and outputting a piece of the modification information corresponding to the piece of difference information that has been extracted.

4 Claims, 30 Drawing Sheets

IMPACT INFORMATION 135

| | PLATFORM SOFTWARE | LANGUAGE | DB SOFTWARE | SOURCE CODE | TEST CODE | TEST DATA | DOCUMENT | DB |
|---|---|---|---|---|---|---|---|---|
| COMPARISON RESULT INFORMATION | nginX | Java | — | UPDATE | UPDATE | ADD | ADD | — |
| IMPACT INFORMATION | 0.5 | 0.5 | 0.75 | 1 | 1 | 0.75 | 0.75 | 0.75 |
| COMPARISON RESULT INFORMATION | Apache | Ruby | MySQL | | | UPDATE | UPDATE | UPDATE |
| IMPACT INFORMATION | 0.5 | 0.25 | 0.25 | | | 0.25 | 0.25 | 0.25 |
| COMPARISON RESULT INFORMATION | | PHP | | | | | | |
| IMPACT INFORMATION | | 0.25 | | | | | | |

(56) References Cited

U.S. PATENT DOCUMENTS

| | | | | |
|---|---|---|---|---|
| 2014/0013304 | A1* | 1/2014 | Vangala | G06F 8/75<br>717/123 |
| 2015/0081572 | A1* | 3/2015 | Thomas | G06Q 10/20<br>705/305 |
| 2016/0034269 | A1* | 2/2016 | Furuichi | H04L 67/34<br>717/169 |

* cited by examiner

FIG. 10

ADMINISTRATION INFORMATION 133

| ID | FILE NAME | FILE PATH | UPDATE DATE AND TIME |
|---|---|---|---|
| 97893 | User.java | /util/mng/ | 2014/09/29 10:30:12 |
| 97894 | Admin.java | /util/mng/ | 2014/09/28 22:15:58 |
| 97895 | Log.java | /util/mng/ | 2014/09/25 09:34:31 |

FIG. 11

ADMINISTRATION INFORMATION 133

| ID | FILE NAME | FILE PATH | UPDATE DATE AND TIME |
|---|---|---|---|
| 97893 | User.java | /util/mng/ | 2014/09/29 10:30:12 |
| 97894 | Admin.java | /util/mng/ | 2014/09/28 22:15:58 |
| 97895 | Log.java | /util/mng/ | 2014/09/30 15:24:51 |

FIG. 13

FIRST DIFFERENCE INFORMATION

| SOURCE CODE | TEST CODE | TEST DATA | DOCUMENT | DB |
|---|---|---|---|---|
| ADD | ADD | — | ADD | — |

FIG. 15

FIRST DIFFERENCE INFORMATION

| SOURCE CODE | TEST CODE | TEST DATA | DOCUMENT | DB |
|---|---|---|---|---|
| UPDATE | UPDATE | UPDATE | UPDATE | UPDATE |

FIG. 16

FIRST DIFFERENCE INFORMATION

| PLATFORM SOFTWARE | LANGUAGE | DB SOFTWARE | SOURCE CODE | TEST CODE | TEST DATA | DOCUMENT | DB |
|---|---|---|---|---|---|---|---|
| Apache | PHP | MySQL | UPDATE | UPDATE | UPDATE | UPDATE | UPDATE |

FIG. 17

DIFFERENCE INFORMATION 131

| ID | PLATFORM SOFTWARE | LANGUAGE | DB SOFTWARE | SOURCE CODE | TEST CODE | TEST DATA | DOCUMENT | DB | MODIFICATION INFORMATION |
|---|---|---|---|---|---|---|---|---|---|
| 1 | nginX | PHP | MySQL | UPDATE | UPDATE | UPDATE | UPDATE | UPDATE | 3 |
| 2 | Apache | Ruby | — | UPDATE | UPDATE | ADD | ADD | — | 4 |
| 3 | nginX | Java | — | DELETE | DELETE | DELETE | DELETE | — | 2 |

FIG. 18

SPECIFIC EXAMPLE OF SIMILARITY CALCULATION (FIRST DIFFERENCE INFORMATION)

| PLATFORM SOFTWARE | LANGUAGE | DB SOFTWARE | SOURCE CODE | TEST CODE | TEST DATA | DOCUMENT | DB |
|---|---|---|---|---|---|---|---|
| Apache | PHP | MySQL | UPDATE | UPDATE | UPDATE | UPDATE | UPDATE |

| | | | | | | | |
|---|---|---|---|---|---|---|---|
| ↕ ○ | ↕ × | ↕ × | ↕ ○ | ↕ ○ | ↕ × | ↕ × | ↕ × |

(PIECES OF DIFFERENCE INFORMATION INCLUDED IN DIFFERENCE INFORMATION 131)

| PLATFORM SOFTWARE | LANGUAGE | DB SOFTWARE | SOURCE CODE | TEST CODE | TEST DATA | DOCUMENT | DB |
|---|---|---|---|---|---|---|---|
| Apache | Ruby | — | UPDATE | UPDATE | ADD | ADD | — |

FIG. 19

MODIFICATION INFORMATION 132

| ITEM NUMBER | MANAGEMENT MODIFICATION INFORMATION |
|---|---|
| 1 | MANAGEMENT TEST ITEM DELETION |
| 2 | MANAGEMENT TEST ITEM ADDITION |
| 3 | DB BACKUP SCRIPT REVISION |
| 4 | SETTING FILE BACKUP ADDITION |
| 5 | SETTING FILE BACKUP DELETION |
| 6 | MONITORING ITEM ADDITION |
| 7 | MONITORING ITEM DELETION |
| 8 | MONITORING ITEM UPDATE |

FIG. 20

SPECIFIC EXAMPLE OF MANAGEMENT INFORMATION (AT TIME OF OUTPUT)

(1) CONTENTS OF CURRENT UPDATE

| PLATFORM SOFTWARE | LANGUAGE | DB SOFTWARE | SOURCE CODE | TEST CODE | TEST DATA | DOCUMENT | DB |
|---|---|---|---|---|---|---|---|
| Apache | PHP | MySQL | UPDATE | UPDATE | UPDATE | UPDATE | UPDATE |

(2) MANAGEMENT MODIFICATION CANDIDATE

DB BACKUP SCRIPT REVISION (SIMILARITY OF 0.9)

FIG. 21

DIFFERENCE INFORMATION 131

| ID | PLATFORM SOFTWARE | LANGUAGE | DB SOFTWARE | SOURCE CODE | TEST CODE | TEST DATA | DOCUMENT | DB | MODIFICATION INFORMATION |
|---|---|---|---|---|---|---|---|---|---|
| 1 | nginX | PHP | MySQL | UPDATE | UPDATE | UPDATE | UPDATE | UPDATE | 3 |
| 2 | Apache | Ruby | — | UPDATE | UPDATE | ADD | ADD | — | 4 |
| 3 | nginX | Java | — | DELETE | DELETE | DELETE | DELETE | — | 2 |
| 4 | Apache | PHP | MySQL | UPDATE | UPDATE | UPDATE | UPDATE | UPDATE | 3 |

FIG. 22

SPECIFIC EXAMPLE OF MANAGEMENT INFORMATION (AT TIME OF OUTPUT)

(1) CONTENTS OF CURRENT UPDATE

| PLATFORM SOFTWARE | LANGUAGE | DB SOFTWARE | SOURCE CODE | TEST CODE | TEST DATA | DOCUMENT | DB |
|---|---|---|---|---|---|---|---|
| — | — | — | — | — | — | — | ADD |

(2) MANAGEMENT MODIFICATION CANDIDATE

NONE

FIG. 23

DIFFERENCE INFORMATION 131

| ID | PLATFORM SOFTWARE | LANGUAGE | DB SOFTWARE | SOURCE CODE | TEST CODE | TEST DATA | DOCUMENT | DB | MODIFICATION INFORMATION |
|---|---|---|---|---|---|---|---|---|---|
| 1 | nginX | PHP | MySQL | UPDATE | UPDATE | UPDATE | UPDATE | UPDATE | 3 |
| 2 | Apache | Ruby | — | UPDATE | UPDATE | ADD | ADD | — | 4 |
| 3 | nginX | Java | — | DELETE | DELETE | DELETE | DELETE | — | 2 |
| 4 | — | — | — | — | — | — | — | ADD | 6 |

FIG. 24

SPECIFIC EXAMPLE OF MANAGEMENT INFORMATION (AT TIME OF OUTPUT)

(1) CONTENTS OF CURRENT UPDATE

| PLATFORM SOFTWARE | LANGUAGE | DB SOFTWARE | SOURCE CODE | TEST CODE | TEST DATA | DOCUMENT | DB |
|---|---|---|---|---|---|---|---|
| nightX | PHP | MySQL | UPDATE | UPDATE | UPDATE | UPDATE | UPDATE |

(2) MANAGEMENT MODIFICATION CANDIDATE

DB BACKUP SCRIPT REVISION (SIMILARITY OF 1.0)

FIG. 25

DIFFERENCE INFORMATION 131

| ID | PLATFORM SOFTWARE | LANGUAGE | DB SOFTWARE | SOURCE CODE | TEST CODE | TEST DATA | DOCUMENT | DB | NUMBER OF TIMES | MODIFICATION INFORMATION |
|---|---|---|---|---|---|---|---|---|---|---|
| 1 | nginX | PHP | MySQL | UPDATE | UPDATE | UPDATE | UPDATE | UPDATE | 2 | 3 |
| 2 | Apache | Ruby | — | UPDATE | UPDATE | ADD | ADD | — | 1 | 4 |
| 3 | nginX | Java | — | DELETE | DELETE | DELETE | DELETE | — | 1 | 2 |
| 4 | Apache | PHP | MySQL | UPDATE | UPDATE | UPDATE | UPDATE | UPDATE | 1 | 3 |

FIG. 26

IMPACT INFORMATION 135

| PLATFORM SOFTWARE | LANGUAGE | DB SOFTWARE | SOURCE CODE | TEST CODE | TEST DATA | DOCUMENT | DB |
|---|---|---|---|---|---|---|---|
| 0.2 | 0.5 | 0.3 | 0.9 | 0.8 | 0.5 | 0.3 | 0.3 |

FIG. 28

DIFFERENCE INFORMATION 131

| ID | PLATFORM SOFTWARE | LANGUAGE | DB SOFTWARE | SOURCE CODE | TEST CODE | TEST DATA | DOCUMENT | DB | MODIFICATION INFORMATION |
|---|---|---|---|---|---|---|---|---|---|
| 1 | Apache | Ruby | — | UPDATE | UPDATE | ADD | ADD | — | 4 |
| 2 | nginX | PHP | MySQL | UPDATE | UPDATE | UPDATE | UPDATE | UPDATE | 3 |
| 3 | nginX | Java | — | DELETE | DELETE | DELETE | DELETE | — | 2 |
| 4 | nginX | Java | — | UPDATE | UPDATE | ADD | ADD | — | 4 |
| 5 | nginX | Java | PHP | UPDATE | UPDATE | UPDATE | UPDATE | — | 4 |
| 6 | Apache | Java | MySQL | UPDATE | UPDATE | ADD | ADD | UPDATE | 4 |

FIG. 29

PIECES OF DIFFERENCE INFORMATION 131 EXTRACTED FROM DIFFERENCE INFORMATION

| ID | PLATFORM SOFTWARE | LANGUAGE | DB SOFTWARE | SOURCE CODE | TEST CODE | TEST DATA | DOCUMENT | DB | MODIFICATION INFORMATION |
|---|---|---|---|---|---|---|---|---|---|
| 1 | Apache | Ruby | — | UPDATE | UPDATE | ADD | ADD | — | 4 |
| 4 | nginX | Java | — | UPDATE | UPDATE | ADD | ADD | — | 4 |
| 5 | nginX | Java | PHP | UPDATE | UPDATE | UPDATE | UPDATE | — | 4 |
| 6 | Apache | Java | MySQL | UPDATE | UPDATE | ADD | ADD | UPDATE | 4 |

FIG. 30

IMPACT INFORMATION 135

| | PLATFORM SOFTWARE | LANGUAGE | DB SOFTWARE | SOURCE CODE | TEST CODE | TEST DATA | DOCUMENT | DB |
|---|---|---|---|---|---|---|---|---|
| COMPARISON RESULT INFORMATION | nginX | Java | — | UPDATE | UPDATE | ADD | ADD | — |
| IMPACT INFORMATION | 0.5 | 0.5 | 0.75 | 1 | 1 | 0.75 | 0.75 | 0.75 |
| COMPARISON RESULT INFORMATION | Apache | Ruby | MySQL | | | UPDATE | UPDATE | UPDATE |
| IMPACT INFORMATION | 0.5 | 0.25 | 0.25 | | | 0.25 | 0.25 | 0.25 |
| COMPARISON RESULT INFORMATION | | PHP | | | | | | |
| IMPACT INFORMATION | | 0.25 | | | | | | |

RELEVANT-INFORMATION PROVIDING METHOD, RELEVANT-INFORMATION PROVIDING APPARATUS, AND RELEVANT-INFORMATION PROVIDING PROGRAM

CROSS-REFERENCE TO RELATED APPLICATION

This application is based upon and claims the benefit of priority of the prior Japanese Patent Application No. 2015-016599, filed on Jan. 30, 2015, the entire contents of which are incorporated herein by reference.

FIELD

The present invention relates to a relevant-information providing method, a relevant-information providing apparatus, and a relevant-information providing program.

BACKGROUND

An operator that provides service to users (hereinafter also simply referred to as an operator), for example, constructs a business system to implement provision of the service. To implement the addition of a function to the business system, for example, the operator updates, according to need, an application that is in operation in the business system (this is hereinafter also referred to as update of the application). The update of the application is performed by releasing the application that has been updated (hereinafter also referred to as the updated application) by a developer of the application (hereinafter also simply referred to as a developer) to the business system.

When the application is developed as described above, the developer, for example, utilizes a tool that automatically executes verification tests on the application. In this way the developer can, for example, make the development of applications efficient so as to allow the applications to be more frequently released (see, for example, Japanese Laid-open Patent Publication Nos. 2008-021111 and 2011-248658).

The release of an updated application, however, may influence managing operations (for example, data backup and operation monitoring) that are associated with the business system. Thus, a manager of the business system (hereinafter also simply referred to as a manager) needs to review the details of the managing operations to be performed on the business system when the updated application is released.

However, when, for example, the manager of the application is different from the developer of the application, the manager has difficulty understanding the detailed modification information on the updated application. Thus, the manager may have difficulty identifying those managing operations that are to be modified as a result of the release of the updated application.

SUMMARY

According to an aspect of the embodiment, a relevant-information providing method includes: in response to update of an application carried out in a system, storing, by a processor, in a storage, difference information that is a difference between information on the application that has not been updated and information on the application that has been updated and modification information on management of the system modified as a result of the update such that the difference information and the modification information are associated with each other; in response to acquisition of update information on a first application, extracting, by a processor, from the stored difference information, a piece of difference information that is in a predetermined similarity relation with first difference information that is a difference between information on the first application that has not been updated and information on the first application that has been updated; and outputting, by a processor, a piece of the modification information corresponding to the piece of difference information that has been extracted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating a specific example of the administration information 133 in the first embodiment.

FIG. 11 is a diagram illustrating a specific example of the administration information 133 obtained when an application is updated after the state depicted in FIG. 10.

FIG. 13 is a diagram illustrating a specific example of the first difference information corresponding to the example illustrated in FIG. 12.

FIG. 15 is a diagram illustrating a specific example of the first difference information corresponding to the example illustrated in FIG. 14.

FIG. 16 is a diagram illustrating a specific example of the first difference information.

FIG. 17 is a diagram illustrating a specific example of the difference information 131.

FIG. 18 is a diagram illustrating a specific example of calculation of the similarity.

FIG. 19 is a diagram illustrating a specific example of the modification information 132.

FIG. 20 is a diagram illustrating a specific example of the output management information.

FIG. 21 is a diagram illustrating a specific example of the difference information 131 in a state following the state depicted in FIG. 17.

FIG. 22 is a diagram illustrating a specific example of the output management information.

FIG. 23 is a diagram illustrating a specific example of the difference information 131 in the state following the state depicted in FIG. 17.

FIG. 24 is a diagram illustrating a specific example of the output management information.

FIG. 25 is a diagram illustrating a specific example of the difference information 131.

FIG. 26 is a diagram illustrating a specific example of the influence information 135.

FIG. 28 is a diagram illustrating the influence determining process.

FIG. 29 is a diagram illustrating the influence determining process.

FIG. 30 is a diagram illustrating a specific example of the influence information.

DESCRIPTION OF EMBODIMENTS

Configuration of the Information Processing System

Figure 1:
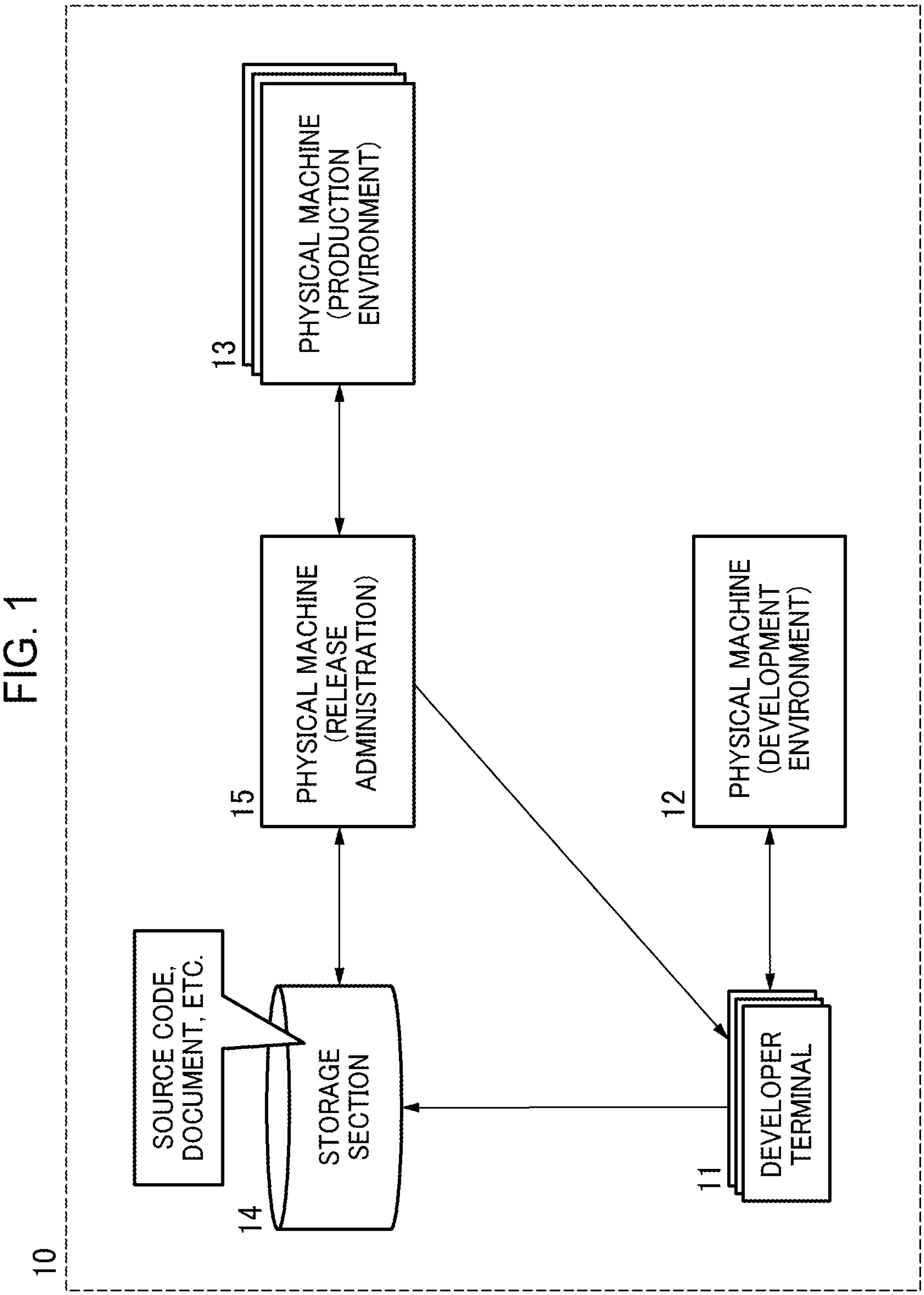
FIG. 1 is a diagram depicting a general configuration of an information processing system.

FIG. 1 is a diagram depicting a general configuration of an information processing system. An information processing system 10 depicted in FIG. 1 has, for example, a developer terminal 11 that allows a developer to perform operations such as development of an application and a physical machine 12 functioning as a development environment utilized by the developer to execute work. The information processing system 10 depicted in FIG. 1 also has a physical machine 13 functioning as a production environment that provides service to users and a storage section 14 that stores source codes and documents created by the developer. The information processing system 10 depicted in FIG. 1 has a physical machine 15 that manages release of applications to the physical machine 13.

The storage section 14 stores and manages source codes, applications, documents, and the like created by the developer, according to version. The storage section 14 also stores, for example, setting information needed to construct a development environment.

The physical machine 15, for example, automatically releases applications stored in the storage section 14 based on a schedule specified by the developer (operator). The physical machine 15 also manages information on the past releases of applications (release dates, the versions of the applications, and the like).

Moreover, the physical machine 15, for example, functions as a test environment that allows applications created by the developer to be tested. The physical machine 15 automatically tests an application stored in the storage section 14 and transmits test results (for example, information indicating that an error has been output) to the developer terminal 11. Thus, the physical machine 15 enables a reduction in work burden on the developer. An operator may provide a physical machine different from the physical machine 15 and allow this physical machine to function as a test environment that allows applications to be tested.

Modification of Managing Operations as a Result of a Release

Figure 2:
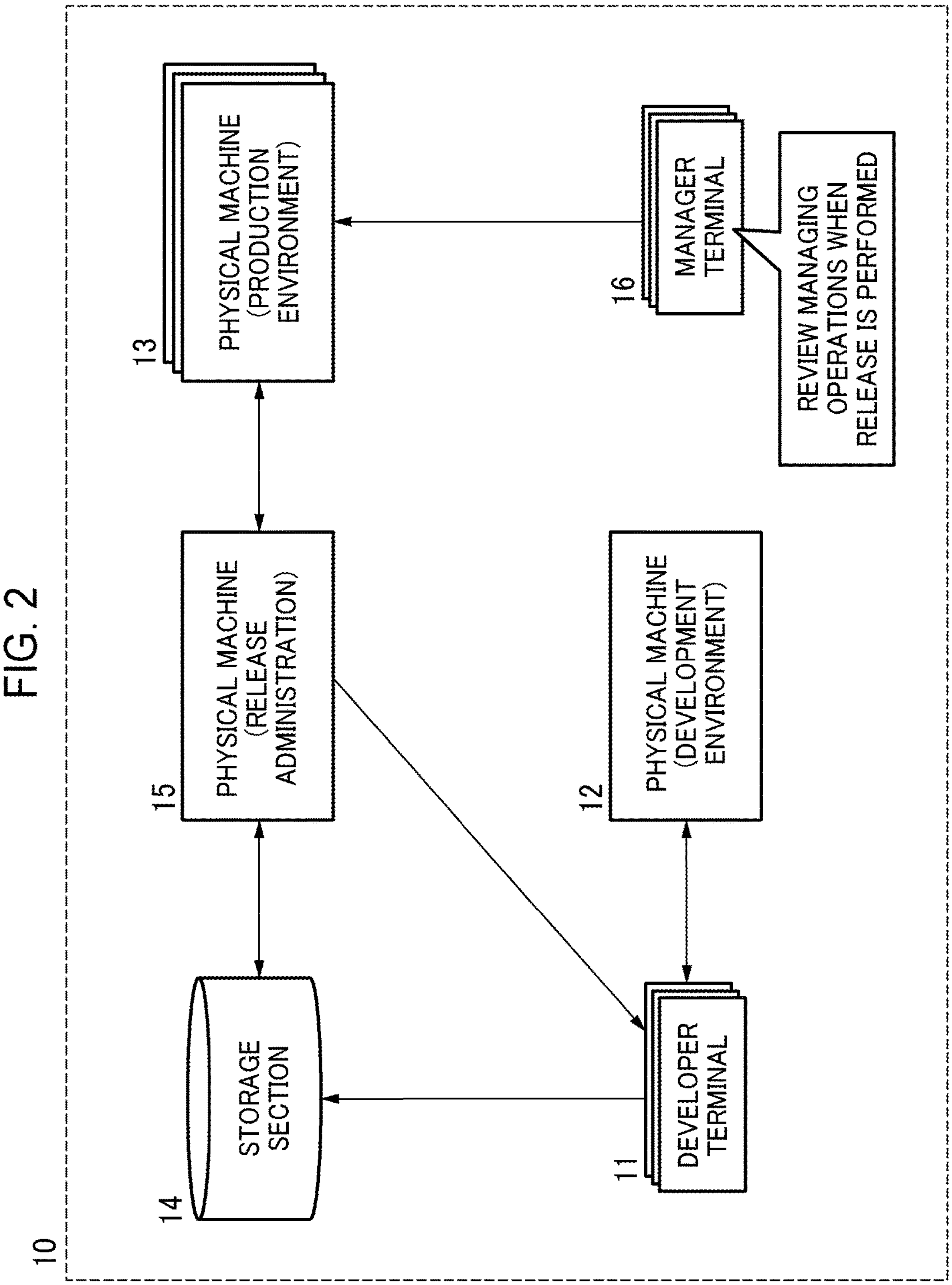
FIG. 2 is a diagram illustrating a modification of managing operations as a result of release of an application.

FIG. 2 is a diagram illustrating a modification of managing operations as a result of release of an application. The information processing system 10 in an example in FIG. 2 has a manager terminal 16 that allows a manager to execute work.

The manager terminal 16, for example, allows the manager to perform the managing operations such as monitoring of the production environment (physical machine 13) and backup of data.

In the information processing system 10 depicted in FIG. 2, when the physical machine 15 releases an updated application, the release of the updated application may influence the managing operations associated with a business system. Thus, when the updated application is released, a manager of the business system needs to review the contents of the managing operations performed on the business system.

However, when, for example, the manager of the application is different from the developer of the application, the manager has difficulty understanding detailed modification information on the updated application created by the developer. That is, the manager may have difficulty identifying managing operations to be modified as a result of the release of the updated application.

Thus, when the updated application is released, the manager needs to review the entire range of the managing operations that may be influenced by the release. Therefore, execution of the release of the updated application may increase the work burden on the manager.

Figure 3:
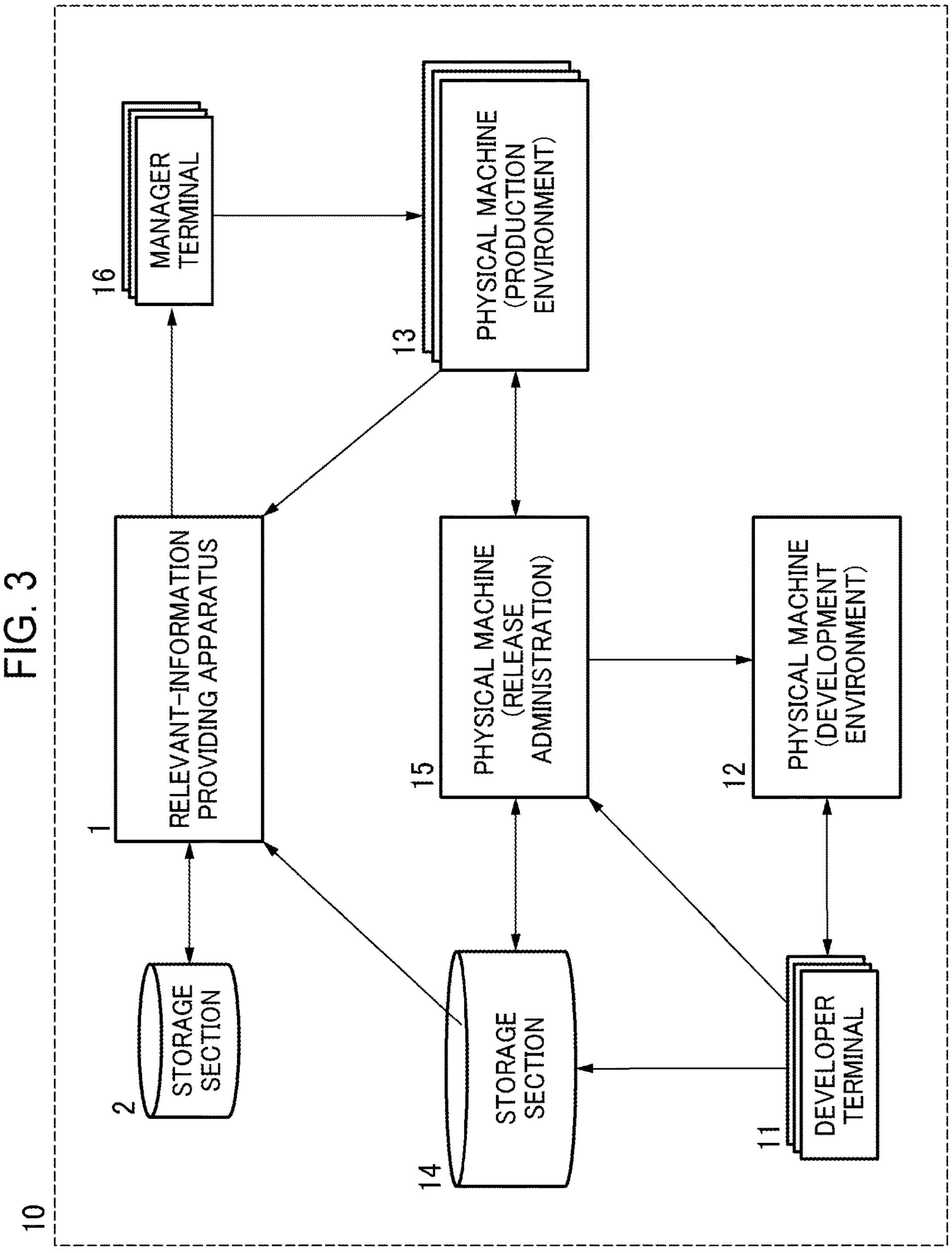
FIG. 3 is a diagram schematically illustrating a relevant-information providing process in a first embodiment.

Thus, the information processing system 10 in the present embodiment has a relevant-information providing apparatus 1 (hereinafter also simply referred to as a physical machine 1) that executes a process of providing information on management to be modified as a result of the release of the application (the process is hereinafter also referred to as a relevant-information providing process), as depicted in FIG. 3.

FIG. 3 is a diagram schematically illustrating a relevant-information providing process in a first embodiment. The relevant-information providing apparatus 1 depicted in FIG. 3, for example, acquires difference information on the difference between the application that has not been updated (non-updated application) and the updated application in response to execution of the release of the application to the production environment. The relevant-information providing apparatus 1, for example, stores, in the storage section 2, the difference information and modification information on the management modified as a result of the update of the application (hereinafter also simply referred to as modification information) such that the difference information and the modification information are associated with each other.

Subsequently, in response to execution of release of a new application (hereinafter also referred to as a first application), the relevant-information providing apparatus 1 acquires difference information on the difference between the non-updated first application and the updated first application (hereinafter also referred to as first difference information). The relevant-information providing apparatus 1 then extracts modification information corresponding to difference information having a predetermined similarity relation with the first difference information from the difference information stored in the storage section 2, and outputs the modification information.

Thus, the relevant-information providing apparatus 1 can provide modification information on modification involved in the release of a new application based on previously accumulated information on releases of applications.

Hardware Configuration of the Relevant-Information Providing Apparatus

Figure 4:
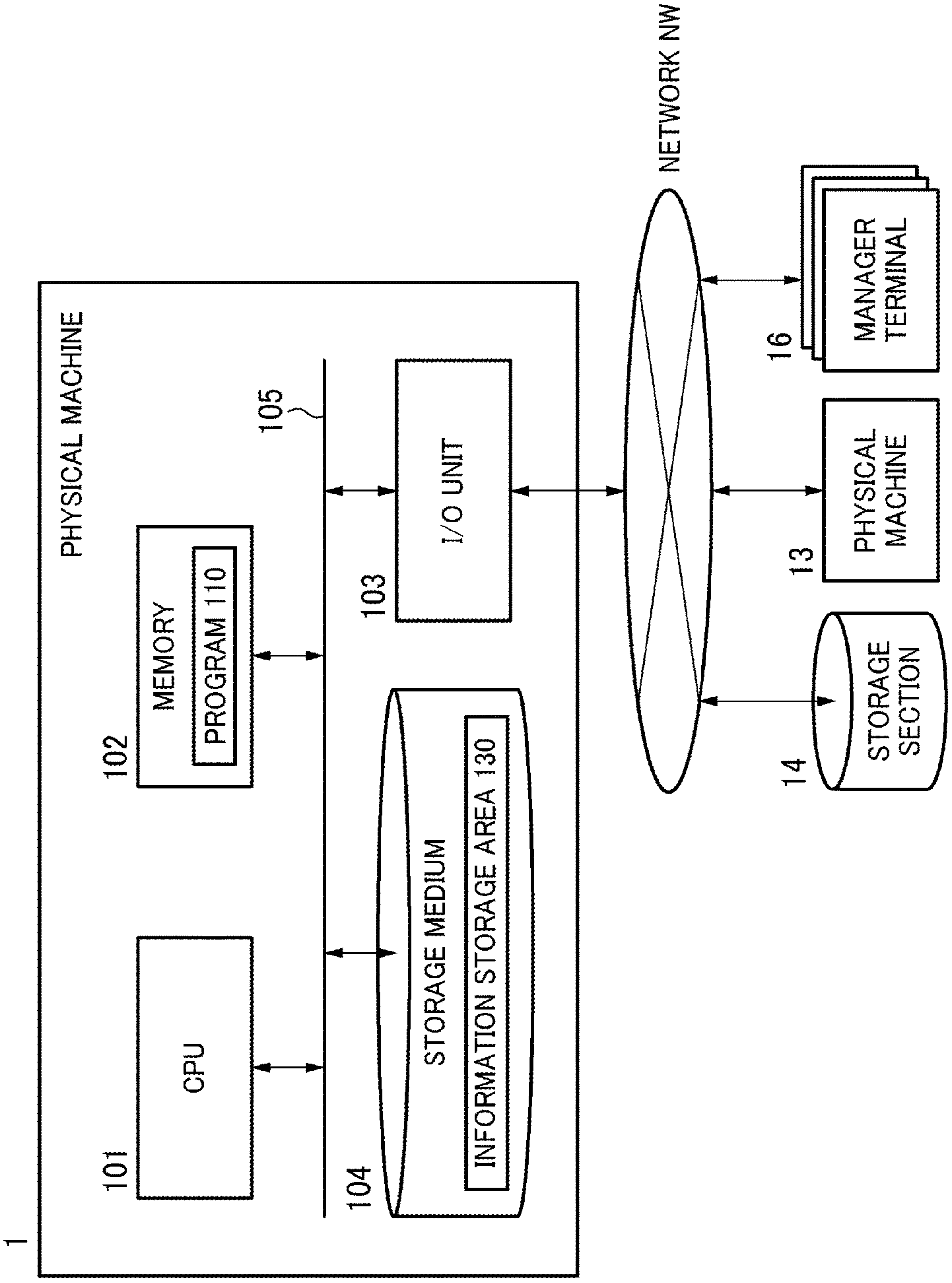
FIG. 4 is a diagram depicting a hardware configuration of the relevant-information providing apparatus.

Now, a hardware configuration of the relevant-information providing apparatus 1 will be described. FIG. 4 is a diagram depicting a hardware configuration of the relevant-information providing apparatus. The physical machine 1 has a CPU 101 that is a processor, a memory 102, an external interface (I/O unit) 103 that allows access to the physical machine 13 and the like, and a storage medium 104. The sections are connected together via a bud 105.

The storage medium 104, for example, stores a program 110 allowing the relevant-information providing process to be executed (hereinafter also referred to as a relevant-information providing program) in a program storage area (not depicted in the drawings) in the storage medium 104. In executing the program 110, the CPU 101 loads the program 110 from the storage medium 104 into the memory 102 and executes the relevant-information providing process in cooperation with the program 110 as depicted in FIG. 4. The storage medium 104, for example, has an information storage area 130 (hereinafter also referred to as a storage section 130) where information used to execute the relevant-information providing process is stored. The information storage area 130 corresponds to, for example, a storage section 2 in FIG. 3.

Configuration of the Physical Machine

Figure 5:
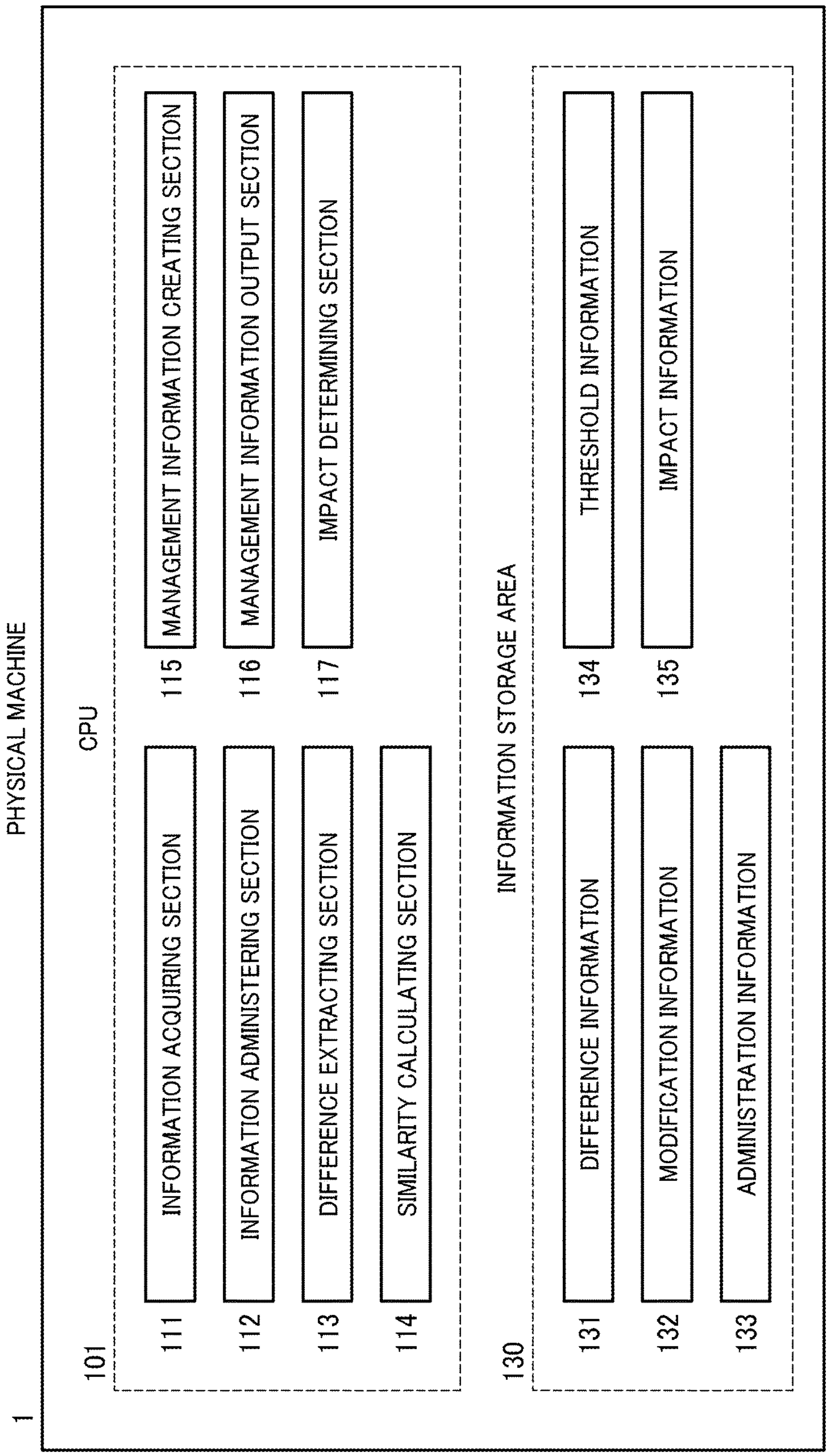
FIG. 5 is a functional block diagram of a physical machine in FIG. 4.

FIG. 5 is a functional block diagram of a physical machine in FIG. 4. The CPU 101 in the physical machine 1 cooperates with the program 110 in operating, for example, as an information acquiring section 111, an information administering section 112, a difference extracting section 113, a similarity calculating section 114, a management information creating section 115, a management information output section 116, and an influence determining section 117. The information storage area 130 stores difference information 131, modification information 132, administration information 133, threshold information 134, and influence information 135. The information acquiring section 111, the information administering section 112, the difference extracting section 113, the similarity calculating section 114, the management information creating section 115, the management information output section 116, and the influence determining section 117 are simply collectively referred to as a processing section.

For example, in response to update of an application (release of the application), the information acquiring section 111 acquires information on the non-updated application and information on the updated application.

The information on the application is, for example, a plurality of pieces of information including a source code for the application (hereinafter also referred to as comparison information). Specifically, the comparison information on the application includes a test code executed when various tests are executed on the application, a document describing functions of the application, and the like. The comparison information may include configuration information on hardware in the production environment (physical machine 13), configuration information on the application running in the production environment, and information on a script executed by the manager performing the managing operations. That is, when the application is released, the information acquiring section 111 acquires information that may be updated as a result of the release, as the comparison information.

The information acquiring section 111 may, for example, access the physical machine 13 (production environment) or the storage section 14 described with reference to FIG. 1 to acquire the source code, the document, or the like when the application is updated.

The information administering section 112, for example, creates administration information 133 when the information acquiring section 111 acquires the comparison information on the application. The administration information 133 is information used to administer information such as the update date and time and the storage location of information for each piece of the comparison information. That is, when the comparison information on the application includes the source code, test data, and the document, the information administering section 112 creates the administration information 133 for the source code, the administration information 133 for the test data and the administration information 133 for the document.

When the information acquiring section 111 acquires the comparison information on the application, the information administering section 112 creates new administration information 133 without updating the past administration information 133. Thus, the information administering section 112 can administer the administration information 133 according to generation of the application. A specific example of the administration information 133 will be described below.

The difference extracting section 113 creates difference information 131 on the difference between the comparison information on the non-updated application acquired by the information acquiring section 111 and the comparison information on the updated application. The difference information 131 is, for example, information (hereinafter also referred to as comparison result information) indicating whether or not each piece of the comparison information on the application has been modified when the application is updated.

Specifically, the difference extracting section 113 references the administration information 133 corresponding to the non-updated application and the administration information 133 corresponding to the updated application. Then, the difference extracting section 113, for example, identifies pieces of the comparison information on the application that have been modified as a result of the update of the application. That is, in this case, the difference extracting section 113 can determine whether or not each piece of the comparison information has been modified without referencing the comparison information itself. Subsequently, the difference extracting section 113, for example, references the contents of the information determined to have been modified as a result of the update of the application, to create difference information 131. A specific example of the difference information 131 will be described below.

After the difference extracting section 113 creates the difference information 131, the information administering section 112 stores, in the information storage area 130, the created difference information 131 and the modification information 132 that is information on the managing operations modified as a result of the update of the application such that the difference information 131 and the modification information 132 are associated with each other. The modification information 132 may be, for example, information determined and input to the relevant-information providing apparatus 1 by the manager when an application is updated. That is, each time an application is released, the information administering section 112 accumulates and stores, in the information storage area 130, the difference information 131 obtained at the time of the release and the modification information 132 on the management modified as a result of the release such that the difference information 131 and the modification information 132 are associated with each other. A specific example of the modification information 132 will be described below.

When a new application (first application) is updated after the information administering section 112 stores the difference information 131 and the modification information 132 in the information storage area 130 such that the difference information 131 and the modification information 132 are associated with each other, the information acquiring section 111 acquires the comparison information on the first application. Specifically, the information acquiring section 111, for example, acquires the comparison information on the non-updated first application and the comparison information on the updated first application.

Then, the difference extracting section 113 creates first difference information that is information on the difference between the comparison information on the non-updated first application and the comparison information on the updated first application.

The similarity calculating section 114, for example, calculates similarity between the first difference information acquired by the difference extracting section 113 and each piece of difference information included in the difference information 131. The similarity is, for example, the rate, in the comparison result information in the first difference information, of pieces of information that have contents equal to contents in the comparison result information in the pieces of difference information included in the difference information 131. A specific example of calculation of the similarity will be described below.

Based on the calculated similarity, the similarity calculating section 114 determines whether or not the first difference information acquired by the difference extracting section 113 is in a predetermined similarity relation with each piece of difference information included in the difference information 131. The predetermined similarity relation is, for example, a relation in which the similarity between the first difference information and a piece of difference information included in the difference information 131 is equal to or higher than the threshold information 134. The threshold information 134 may be, for example, pre-stored in the information storage area 130 by the manager.

The similarity calculating section 114 may, for example, calculate the similarity using the influence information 135. The influence information 135 may be information predetermined and stored in the information storage area 130 by the manager. A specific example of the influence information 135 will be described below.

For example, based on the difference information extracted from the difference information 131 by the similarity calculating section 114, the management information creating section 115 creates output information to be presented to the manager. A specific example of the output information will be described below. Then, the management information output section 116, for example, outputs the output information created by the management information creating section 115. Specifically, the management information output section 116 may, for example, output the output information to the manager terminal 16.

The influence determining section 117, for example, recalculates the influence information 135 when the difference information 131 stored in the information storage area 130 is updated. A specific example of the recalculation of the influence information 135 will be described below.

First Embodiment

Figure 6B:
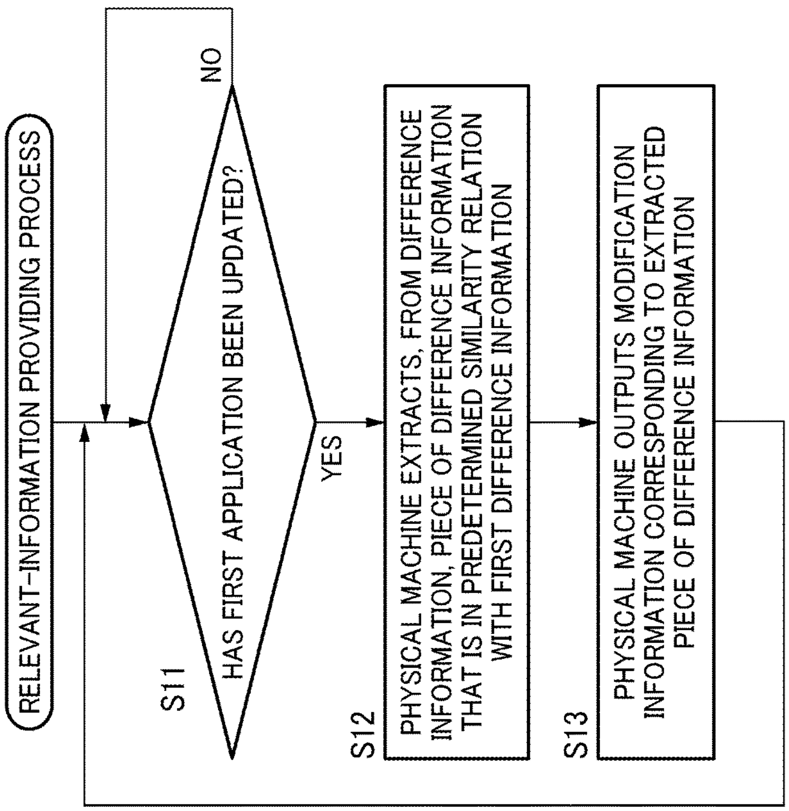
FIGS. 6A and 6B are flowcharts schematically illustrating the relevant-information providing process in the first embodiment.
Figure 6A:
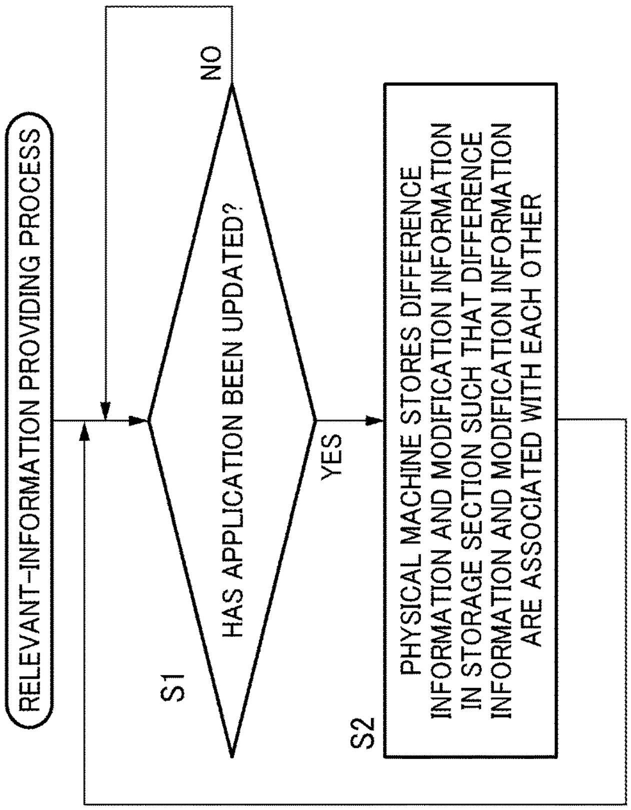

Now, a first embodiment will be described. FIGS. 6A and 6B are flowcharts schematically illustrating the relevant-information providing process in the first embodiment. For convenience, the relevant-information providing process in FIGS. 6A and 6B will be schematically described with reference to FIG. 3.

The relevant-information providing apparatus 1, for example, waits until an application is updated as illustrated in a flowchart in FIG. 6A (NO in S1). Specifically, the relevant-information providing apparatus 1, for example, determines that the application has been updated in the physical machine 13 upon receiving information indicating that the application has been updated, from the physical machine 13.

Upon detecting that the application has been updated (YES in S1), the relevant-information providing apparatus 1 creates difference information 131 that is information on the difference between the information on the non-updated application and the information on the updated application (S2). Specifically, the relevant-information providing apparatus 1 may access the physical machine 13 and the storage section 14 to acquire needed information to create difference information 131.

Furthermore, the relevant-information providing apparatus 1, for example, acquires the modification information 132 determined by the manager as a result of the release of the updated application (S2). Specifically, the modification information 132 may be input by the manager.

Then, the relevant-information providing apparatus 1, for example, stores the acquired difference information 131 and modification information 132 in the information storage area 130 such that the difference information 131 and the modification information 132 are associated with each other (S2). That is, each time an application is released, the relevant-information providing apparatus 1 accumulates the difference information 131 and the modification information 132 in the information storage area 130 such that the difference information 131 and the modification information 132 are associated with each other.

Subsequently, as illustrated in a flowchart in FIG. 6B, the relevant-information providing apparatus 1, for example, waits until a new application (first application) is updated (NO in S11). When the first application is updated (YES in S11), the relevant-information providing apparatus 1, for example, extracts, from the difference information 131, pieces of difference information that are in a predetermined similarity relation with first difference information (S12). A specific example of the predetermined similarity relation will be described below.

That is, the managing operations performed by the manager are determined based on the contents of the source code, the configuration information on the hardware, and the like. Thus, when an application is released, the relevant-information providing apparatus 1 can estimate the influenced range of the managing operations by identifying information modified as a result of the update of the application.

Specifically, for example, when the source code is modified as a result of the update of the application, the contents of service available to users (functions that can be provided to users) are modified. Thus, when the source code is modified, the relevant-information providing apparatus 1 can estimate that items of management tests executed by the manager need to be modified.

For example, when the configuration information is modified as a result of the update of the application, this means that the configuration of the hardware in the physical machine 13 has been modified. Thus, when the configuration information on the hardware is modified, the relevant-information providing apparatus 1 can estimate that monitoring items for the hardware need to be modified.

Therefore, when an application is updated, the relevant-information providing apparatus 1 in the present embodiment accumulates, in the information storage area 130, information including the difference information 131 and the modification information 132 such that the information and the modification information 132 are associated with each other. When a new application is released, the relevant-information providing apparatus 1 determines whether or not the accumulated difference information 131 contains a piece of difference information that is in the predetermined similarity relation with the first difference information corresponding to the release of the new application. When a piece of difference information that is in the predetermined similarity relation is found, the relevant-information providing apparatus 1 extracts the modification information 132 stored in the information storage area 130 in association with the found piece of difference information.

Thus, the relevant-information providing apparatus 1 can acquire information on the managing operations estimated to be modified from the previously accumulated difference information 131 and modification information 132 when a new application is released. Consequently, when a new application is released, the manager need not review the entire range of the managing operations that may be influenced by the release. An increase in work burden on the manager is thus suppressed.

Subsequently, the relevant-information providing apparatus 1, for example, outputs the modification information 132 corresponding to the difference information extracted in S12 (S13).

As described above, according to the first embodiment, the relevant-information providing apparatus 1 acquires, in response to update of an application, the difference information 131 that is the difference between information on the non-updated application and information on the updated application. The relevant-information providing apparatus 1 stores, in the storage section 130, the difference information 131 and the modification information 132 on the management of the application to be modified as a result of the update of the application such that the difference information 131 and the modification information 132 are associated with each other.

Upon acquiring update information on a first application, the relevant-information providing apparatus 1 acquires first difference information that is the difference between information on the non-updated first application and information on the updated first application. The relevant-information providing apparatus 1 then extracts, from the difference information 131, a piece of difference information that is in the predetermined similarity relation with the first difference information. Subsequently, the relevant-information providing apparatus 1 outputs a piece of the modification information 132 corresponding to the extracted piece of difference information. Consequently, the relevant-information providing apparatus 1 can provide the modification information resulting from the release of the new application.

Details of the First Embodiment

Figure 7:
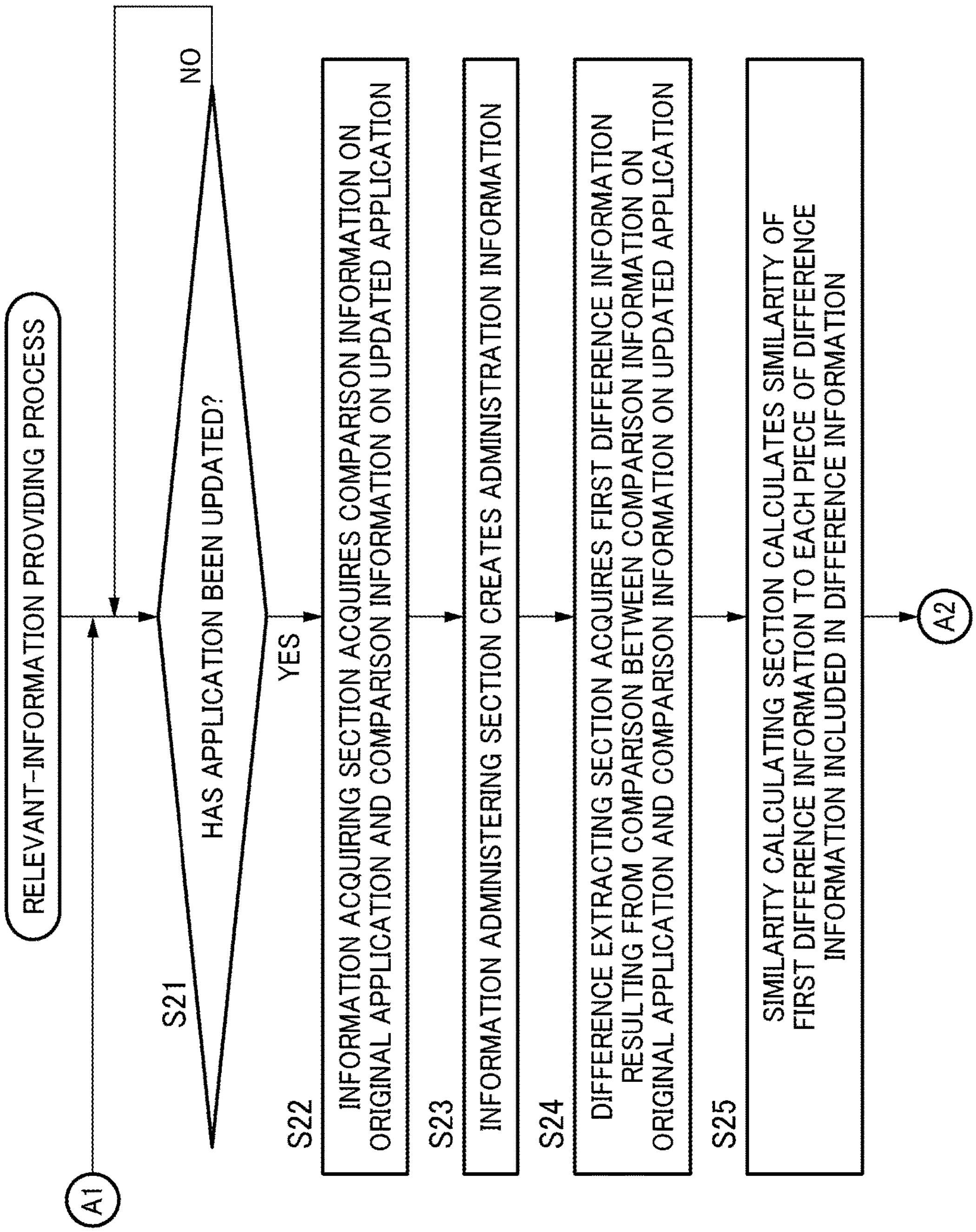
FIG. 7 is a flowchart illustrating the details of the relevant-information providing apparatus in the first embodiment.
Figure 8:
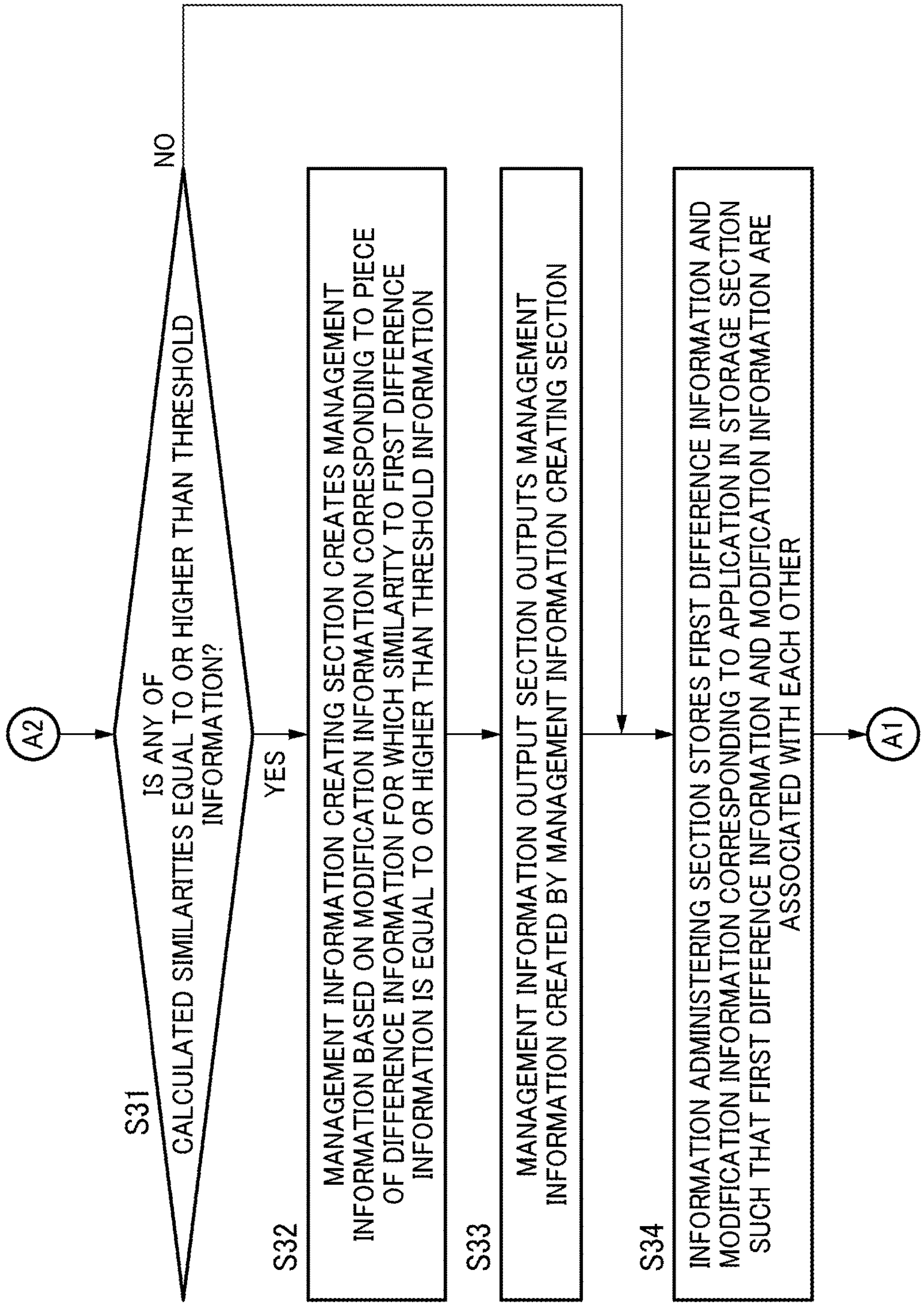
FIG. 8 is a flowchart illustrating the details of the relevant-information providing apparatus in the first embodiment.

Now, the details of the first embodiment will be described. FIG. 7 and FIG. 8 are flowcharts illustrating the details of the relevant-information providing apparatus in the first embodiment. FIGS. 9A and 9B to 30 are diagrams illustrating the details of the relevant-information providing process in the first embodiment. With reference to FIGS. 9A and 9B to 30, the details of the relevant-information providing process in FIG. 7 and FIG. 8 will be described. In the description below, the comparison information includes a source code, a test code, test data, a document, and a DB (Data Base). With reference to FIG. 7 and FIG. 8, the details of a process in the flowchart in FIG. 6B will be described.

First, the information acquiring section 111 of the relevant-information providing apparatus 1, for example, waits until the first application (hereinafter also simply referred to as the application) is updated (NO in S21). When the application is updated (YES in S21), the relevant-information providing apparatus 1, for example, acquires comparison information on the non-updated application and comparison information on the updated application (S22). A specific example of source code of the application and the like will be described below.

Figure 9A:
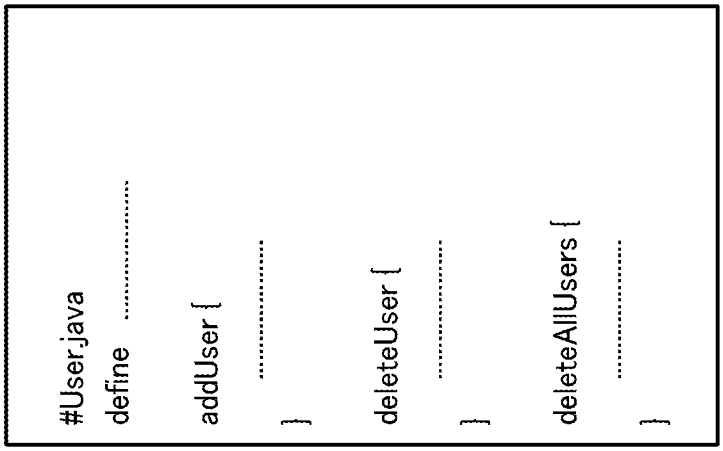
FIGS. 9A and 9B are diagrams illustrating specific examples of the source code and the document in the first embodiment.
Figure 9B:
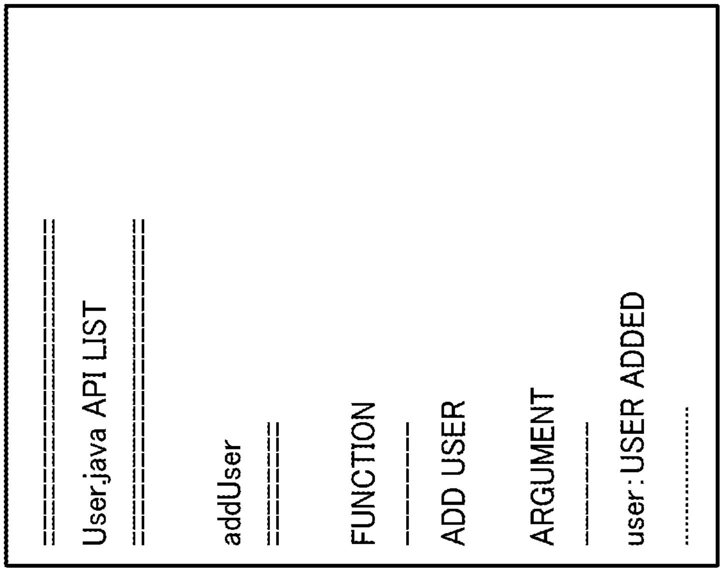

FIGS. 9A and 9B are diagrams illustrating specific examples of the source code and the document in the first embodiment. FIG. 9A depicts a specific example of the source code of an application. FIG. 9B depicts a specific example of the document corresponding to the application.

Upon detecting that the application has been updated, the information acquiring section 111, for example, accesses the storage section 14 to acquire the source code depicted in FIG. 9A. Further, the information acquiring section 111, for example, accesses the physical machine 13 to acquire the document depicted in FIG. 9B.

As seen back in FIG. 7, the information administering section 112 of the relevant-information providing apparatus 1, for example, creates administration information 133 (S23).

Specifically, when the application is updated, the information administering section 112 creates new administration information 133 corresponding to the updated application without deleting the past administration information 133 corresponding to the updated application. Consequently, the information administering section 112 can administer the administration information 133 according to generation. Thus, when the application is updated, the difference extracting section 113 can determine whether or not each piece of information has been updated without referencing the information included in the source code, the document, and the like. A specific example of the administration information 133 will be described.

FIG. 10 is a diagram illustrating a specific example of the administration information 133 in the first embodiment. FIG. 10 illustrates a specific example of the administration information 133 corresponding to the source code of the application.

The administration information 133 depicted in FIG. 10 has, for example, an “ID” identifying each source code, a “file name” that is the name of a file of the source code, a “file path” indicative of a location where the file of the source code is stored, and an "update date and time" indicative of the date and time of the update of the source code.

Specifically, for information with an "ID" of "97893" in the administration information 133 depicted in FIG. 10, "User. java" is set as the "file name" and "/util/mng/" is set as the "file path". For information with an "ID" of "97893" in the administration information 133 depicted in FIG. 10, "Sep. 29, 2014 10:30:12" is set as the "update date and time". Description of the other piece of information in FIG. 10 is omitted.

As seen back in FIG. 7, the difference extracting section 113 of the relevant-information providing apparatus 1, for example, compares the comparison information on the non-updated application with the comparison information on the updated application to acquire first difference information (S24).

Specifically, the difference extracting section 113, for example, acquires the non-updated administration information 133 on the first application and the updated administration information 133 on the first application. The difference extracting section 113 then determines that information corresponding to pieces of the administration information 133 having contents different from the contents prior to the update is information updated as a result of the update of the application. Moreover, the difference extracting section 113, for example, references the information identified as the information modified as a result of the update of the first application to create first difference information. A specific example will be described where the apparatus determines whether or not each piece of information has been modified as a result of the update of the application.

FIG. 11 is a diagram illustrating a specific example of the administration information 133 obtained when an application is updated after the state depicted in FIG. 10.

The administration information 133 depicted in FIG. 11 is different from the administration information 133 depicted in FIG. 10 only in the "update date and time" of the information having a "file name" of "Log. java". Specifically, "Sep. 30, 2014 15:24:51" is set for the "update date and time" of the information having a "file name" of "Log. java" (an underlined portion in FIG. 11).

That is, in the example illustrated in FIG. 10 and FIG. 11, the difference extracting section 113 can determine that a source code with a "file name" of "Log. java" has been modified. Consequently, when the application is updated, the difference extracting section 113 can determine whether or not the source code has been modified without referencing the information included in the source code. This enables a reduction in work load.

Then, the difference extracting section 113 extracts modified contents of the information determined to have been modified as a result of the update of the application to create first difference information. The difference extracting section 113, for example, classifies the modified contents of the information as a result of the update of the application into ADD indicative of addition of information, DELETE indicative of deletion of information, and UPDATE indicative of update of information. When both the addition and the update of information are performed as a result of the update of the application, the difference extracting section 113 may adopt one of the addition of information and the update of information that involves a larger amount of modification. A specific example will be described where the difference extracting section 113 creates first difference information.

Specific Example (1) of the First Difference Information

Figure 12:
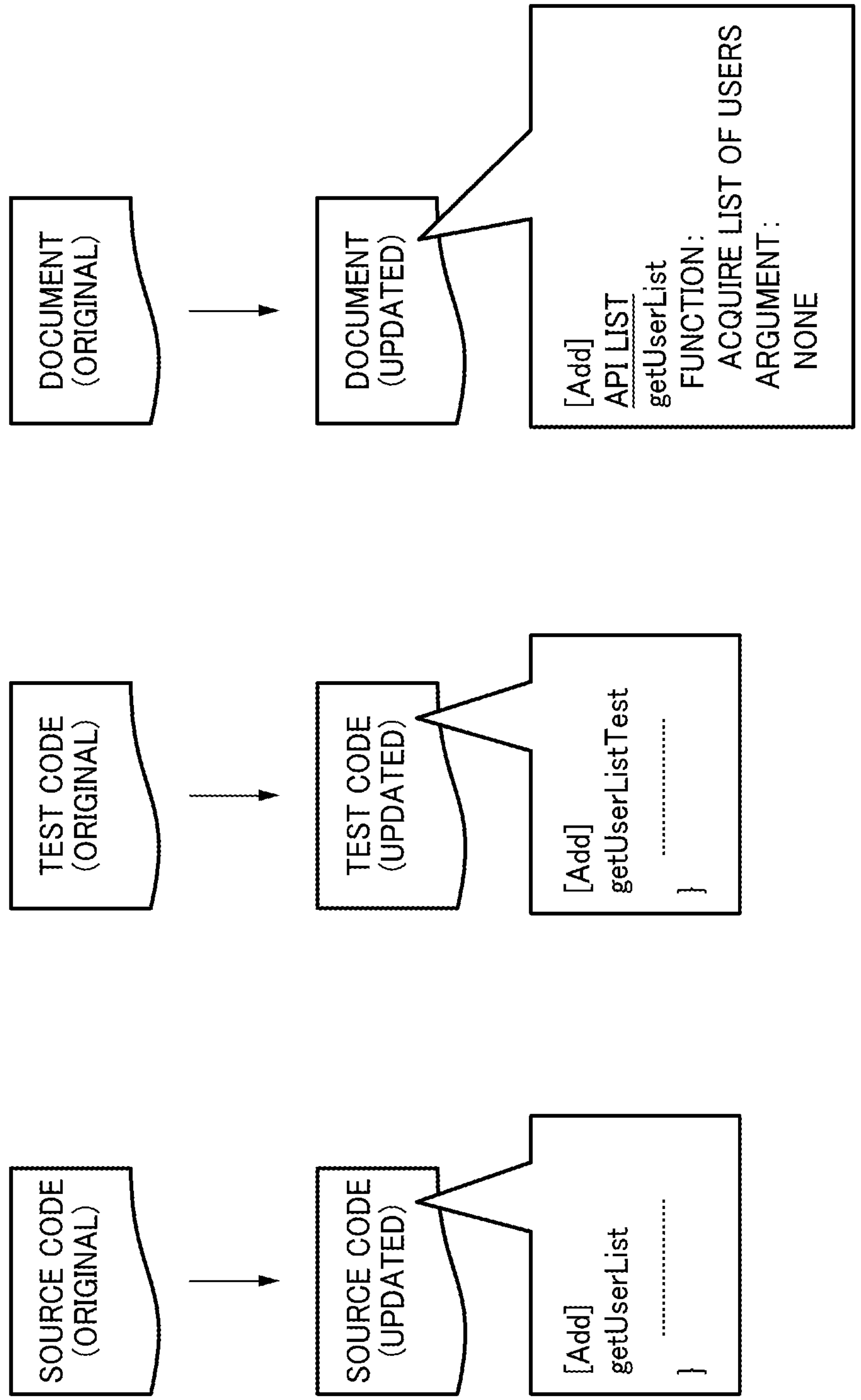
FIG. 12 is a diagram illustrating a specific example relating to information modified as a result of update of an application.

FIG. 12 is a diagram illustrating a specific example relating to information modified as a result of update of an application. In the example illustrated in FIG. 12, a case will be described where, as a result of reference to the administration information 133, the difference extracting section 113 determines that the source code, the test code, and the document have been modified.

In the example illustrated in FIG. 12, the difference extracting section 113 compares the updated source code with the non-updated source code to determine that a description of a new function "getUserList" has been added. The difference extracting section 113 also compares the updated test code with the non-updated test code to determine that a description corresponding to a new function "getUserListTest" has been added. The difference extracting section 113 further compares the updated document with the non-updated document to determine that a description relating to the new function "getUserList".

FIG. 13 depicts a specific example of the first difference information corresponding to the example illustrated in FIG. 12. The first difference information illustrated in FIG. 13 has, as items, a "source code", a "test code", "test data", a "document", and a "DB" that are information on the application.

The difference information 131 sets "ADD" indicative of addition of information in the "source code", the "test code", and the "document" to which information has been added as a result of the update of the first application as depicted in FIG. 13. Furthermore, the difference extracting section 113 leaves blank the "test data" and the "DB" not modified as a result of the update of the first application depicted in FIG. 13. Thus, the difference extracting section 113 can create first difference information.

Specific Example (2) of the First Difference Information

Figure 14:
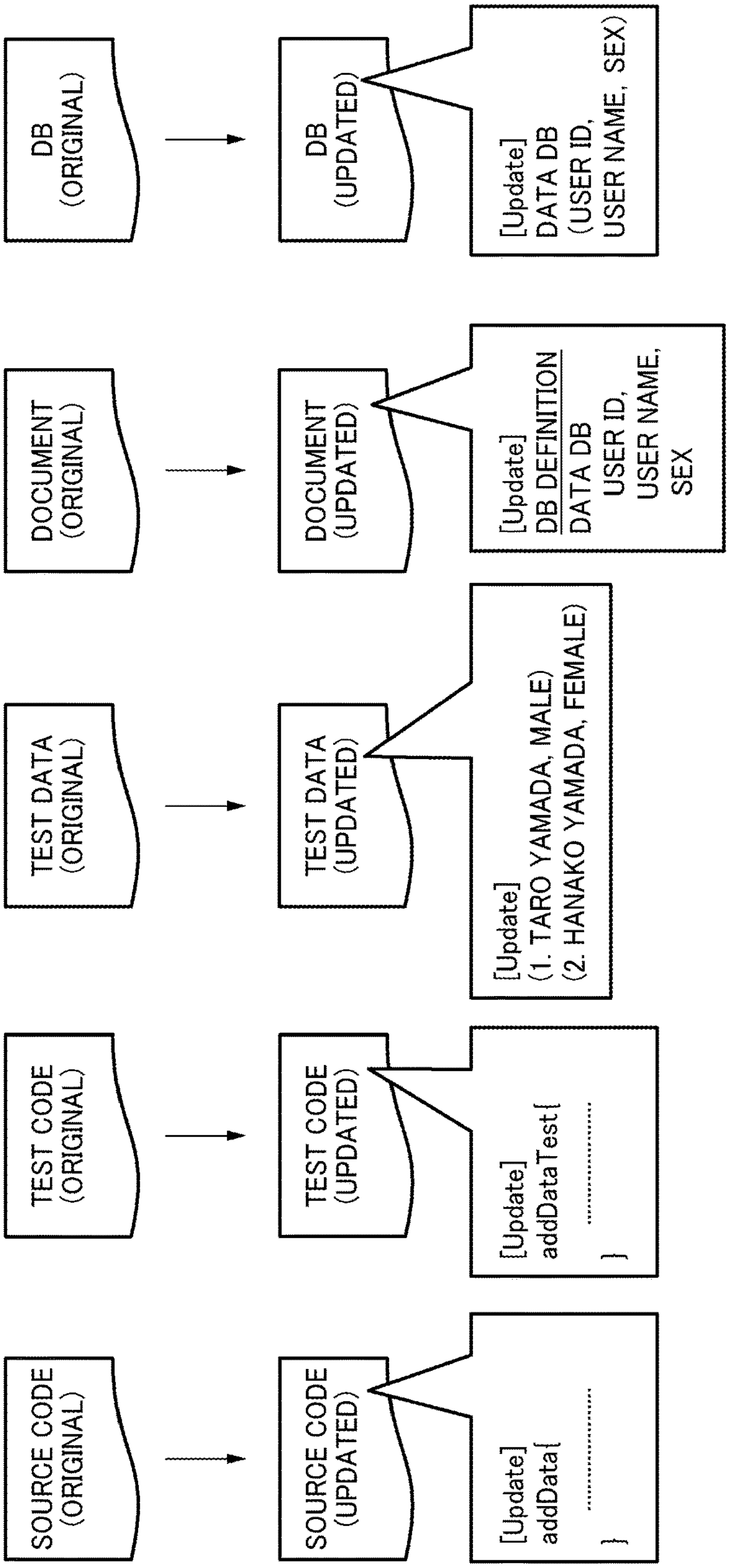
FIG. 14 is a diagram illustrating another specific example relating to the information modified as a result of the update of the first application.

FIG. 14 is a diagram illustrating another specific example relating to the information modified as a result of the update of the first application. In the example illustrated in FIG. 14, a case will be described where, as a result of reference to the administration information 133, the difference extracting section 113 determines that the source code, the test code, the test data, the document, and the DB have been modified.

In the example illustrated in FIG. 14, the difference extracting section 113 compares the updated source code with the non-updated source code to determine that a description of an existing function "addData" has been added. The difference extracting section 113 also compares the updated test code with the non-updated test code to determine that a description corresponding to an existing function "addDataTest" has been updated.

The difference extracting section 113 also compares the updated test data with the non-updated test data to determine that, for example, test data that is "(1, Taro Yamada)" and "(2, Hanako Yamada)" has been updated to "(1, Taro Yamada, male)" and "(2, Hanako Yamada, female)." The difference extracting section 113 also compares the updated document with the non-updated document to determine that a description relating to a DB definition has been updated.

The difference extracting section 113 further compares the updated DB with the non-updated DB to determine that, for example, “data DB (user ID, user name)”, which is the DB definition, has been updated to “data DB (user ID, user name, sex)”.

FIG. 15 depicts a specific example of the first difference information corresponding to the example illustrated in FIG. 14. As depicted in FIG. 15, the difference extracting section 113 sets “UPDATE” indicative of update of information in the “source code”, the “test code”, the “test data”, the “document”, and the “DB” the information in which has been updated as a result of the update of the first application as depicted in FIG. 13. Thus, the difference extracting section 113 can create first difference information that is information modified as a result of the update of the first application.

The difference information 131 and the first difference information may have information indicative of the attribute of the application or the first application. That is, as depicted in FIG. 16, the first difference information may have, as items, “platform software” indicative of platform software allowing the first application to operate and a “language” indicative of a program language for the source code. As depicted in FIG. 16, the first difference information may have, as an item, “DB software” indicative of software to manage the DB. Specifically, in the first difference information depicted in FIG. 16, “Apache” is set in the “platform software”, “PHP” is set in the “language”, and “MySQL” is set in the “DB software”. Thus, the difference extracting section 113 can create difference information such that the difference information includes information such as an operating environment for the application.

As seen back in FIG. 7, the similarity calculating section 114 of the relevant-information providing apparatus 1 calculates the similarity of the first difference information to each piece of difference information included in the difference information 131 (S25). The similarity is, for example, the rate, in the comparison result information in the first difference information acquired in S24, of pieces of information that have contents equal to contents of the comparison result information in the piece of difference information included in the difference information 131. A specific example of the process in S25 will be described below.

FIG. 17 is a diagram illustrating a specific example of the difference information 131. The difference information 131 depicted in FIG. 17 has, for example, in addition to the items of the first difference information depicted in FIG. 16, an “ID” that identifies difference information and “modification information” that is an index to information included in the modification information 132 described below.

Specifically, for a piece of information with an “item number” of “1” included in the difference information 131 depicted in FIG. 17, “nginX” is set in the “platform software”, “PHP” is set in the “language”, and “MySQL” is set in the “DB software”. Furthermore, for the piece of information with an “item number” of “1” included in the difference information 131 depicted in FIG. 17, “UPATE” is set in the “source code, the “test code”, the “test data”, the “document”, and the “DB”, and “3” is set in the modification information”. The other pieces of information in FIG. 17 will not be described.

FIG. 18 is a diagram illustrating a specific example of calculation of the similarity. For an example in FIG. 18, an example of a case will be described where the first difference information depicted in FIG. 16 is compared with a piece of difference information with an item number of “2” included in the difference information 131 depicted in FIG. 17 to calculate the similarity between the first difference information and the piece of difference information.

In the example illustrated in FIG. 18, “Apache” is set in the “platform software” in the first difference information and in the “platform software” in the difference information included in the difference information 131. Therefore, for the information set in the first difference information and the information set in the pieces of difference information included in the difference information 131, the same information is set in the “platform software” (“o” in FIG. 18). Similarly, in the example illustrated in FIG. 18, for the information set in the first difference information and the information set in the pieces of difference information included in the difference information 131, the same information is set in the “source code” and in the “test code”.

On the other hand, for the information set in the first difference information and the information set in the pieces of difference information included in the difference information 131, different information is set in the “language”, the “DB software”, the “test data”, the “document”, and the “DB” (“x” in FIG. 18).

Thus, in the example illustrated in FIG. 18, the similarity calculating section 114 determines that, for three of the eight items of the comparison result information, the comparison result information in the first difference information 131 has the same contents as those of the comparison result information in the pieces of difference information included in the difference information. Then, in this case, the similarity calculating section 114, for example, determines the similarity to be three divided by eight, that is, 0.375.

In calculating the similarity between the first difference information depicted in FIG. 16 and the piece of information with an “item number” of “1” included in the difference information 131 depicted in FIG. 17, the similarity calculating section 114 determines that the two pieces of information are the same for seven of the eight items. Thus, in this case, the similarity calculating section 114, for example, calculates the similarity to be 0.875, which results from division of seven by eight. In calculating the similarity between the first difference information depicted in FIG. 16 and a piece of information with an “item number” of “3” included in the difference information 131 depicted in FIG. 17, the similarity calculating section 114 determines that the two pieces of information are different from each other in all the items. Thus, in this case, the similarity calculating section 114, for example, calculates the similarity to be zero.

As seen back in FIG. 8, the management information creating section 115, for example, determines whether or not any of the calculated similarities is equal to or higher than the threshold information 134 (S31). The threshold information 134 may be, for example, stored in the information storage area 130 by the manager.

If any of the calculated similarities is equal to or higher than the threshold information 134 (YES in S31), the management information creating section 115, for example, creates management information based on the modification information 132 corresponding to the difference information 131 with a similarity of 134 or more to the first difference information (S32). The management information is information that relates to management to be modified as a result of the update of the application and that is presented to the manager. A specific example of the management information will be described below.

Specifically, in the example in FIG. 16 and FIG. 17, the similarities between the first difference information and the respective pieces of difference information included in the difference information 131 are 0.875, 0.375, and 0. Thus, when, for example, the threshold information 134 is 0.5, the management information creating section 115 determines the similarity between the first difference information and the piece of difference information with an "item number" of "1" included in the difference information 131 is equal to or higher than the threshold information 134. The management information creating section 115 then creates management information based on a piece of the modification information 132 corresponding to the piece of difference information with an "item number" of "1" included in the difference information 131. Thus, the relevant-information providing apparatus 1 can provide management information on which the manager can rely.

FIG. 19 is a diagram illustrating a specific example of the modification information 132. The modification information 132 depicted in FIG. 19 has, as items, an "item number" corresponding to the item of the "modification information" in the difference information 131 and "management modification information" that is modification information on the managing operations.

Specifically, in the modification information 132 depicted in FIG. 19, "management test item deletion" indicative of deletion of a test item executed by the manager is set in a piece of "management modification information" with an "item number" of "1". "Management test item addition" indicative of addition of a test item executed by the manager is set in a piece of "management modification information" with an "item number" of "2". "DB backup script revision" indicative revision of a script that allows the DB to be backed up is set in a piece of "management modification information" with an "item number" of "3". "Setting file backup addition" indicative of addition of backup of a setting file is set in a piece of "management modification information" with an "item number" of "4". "Setting file backup deletion" indicative of deletion of backup of the setting file is set in the piece of "management modification information" with an "item number" of "5". "Monitoring item addition" indicative of addition of a monitoring item, "monitoring item deletion" indicative of deletion of a monitoring item, and "monitoring item update" indicative of update of a monitoring item are set in pieces of "management modification information" with "item numbers" of "6", "7", and "8".

Specifically, "3" is set in a piece of "modification information" with an "item number" of "1" in the difference information 131 depicted in FIG. 17. The "DB backup script revision" is set in the piece of "management modification information" with an "item number" of "3" in the modification information 132 depicted in FIG. 19. Thus, in this case, the management information creating section 115 creates management information including, as the DB backup script revision, information on the managing operations to be modified as a result of the update of the application.

As seen back in FIG. 8, the management information output section 116, for example, outputs the management information created by the management information creating section 115 (S33).

On the other hand, if none of the similarities calculated by the similarity calculating section 114 is equal to or higher than the threshold information 134 (NO in S31), the management information creating section 115 creates no management information. In this case, the management information output section 116 outputs no management information. A specific example of management information output to the manager will be described.

FIG. 20 is a specific example of the output management information. The management information output section 116, for example, outputs the first difference information resulting from the current update of the application as the "contents of the current update" as depicted in FIG. 20. Specifically, in the example illustrated in FIG. 20, the management information output section 116, for example, outputs the contents included in the first modification information depicted in FIG. 16. The management information output section 116, for example, outputs the contents of the modification information 132 estimated in S32 as a "management modification candidate" as depicted in FIG. 20. Thus, the manager can recognize information on the management to be modified as a result of the update of the application. The management information output section 116 may, for example, also output the similarity calculated in S25 as depicted in FIG. 20.

As seen back in FIG. 8, the information administering section 112, for example, stores the first difference information and the modification information 132 corresponding to the updated application in the storage section 130 such that the first difference information and the modification information 132 are associated with each other (S34). That is, each time the application is updated, the information administering section 112 accumulates information on the modification information 132 in the storage section 130. Thus, when the application is updated again, the relevant-information providing apparatus 1 can provide more reliable management information to the manager.

FIG. 21 is a diagram illustrating a specific example of the difference information 131 in a state following the state depicted in FIG. 17. In the difference information 131 depicted in FIG. 21, the information administering section 112 newly sets information with the same contents as those of the first difference information 131 output as depicted in FIG. 20, as new information (a piece of information with an "item number" of "4"; an underlined portion in FIG. 21). The information administering section 112 sets "3" corresponding to the DB backup script revision, which is a content of the modification information 132 output as depicted in FIG. 20, as the "modification information" corresponding to the newly set information. That is, when the application is updated, the relevant-information providing apparatus 1 reflects the information on the managing operations modified as a result of the update, in the difference information 131.

Now, a specific example of the management information will be described which is obtained when the similarity calculated in S25 is lower than the threshold information 134. FIG. 22 is a specific example of the output management information.

In the example illustrated in FIG. 22, the management information output section 116, for example, outputs the first difference information resulting from the current update of the application, as the "contents of the current update", as described with reference to FIG. 20. Specifically, in the example illustrated in FIG. 22, the management information output section 116 outputs the first difference information including the "platform software", the "language", the "DB software", the "source code", the "test code", the "test data", and the "document" left blank and with "ADD" set in the "DB".

On the other hand, the management information output section 116, for example, outputs no information reflecting the "management modification candidate" as depicted in FIG. 22. That is, when the similarity calculated in S25 is lower than the threshold information 134, the relevant-information providing apparatus 1 fails to estimate information on the managing operations to be modified as a result of the update of the application. Thus, in this case, the management information output section 116, for example, outputs "none" as the "management modification information" as depicted in FIG. 22.

FIG. 23 is a diagram illustrating a specific example of the difference information 131 in the state following the state depicted in FIG. 17. As described with reference to FIG. 21, the information administering section 112 newly adds, to the difference information 131, information with the same contents as those of the first difference information output as depicted in FIG. 22.

Now, a case will be described where the similarity calculated in S25 is 1.0 (a case where the difference information 131 includes a piece of difference information having completely the same contents as those in the first difference information). FIG. 24 depicts a specific example of the output management information.

In the example depicted in FIG. 24, the management information output section 116, for example, outputs the first difference information resulting from the current update of the application as the "contents of the current update" as described with reference to FIG. 20. Specifically, in the example illustrated in FIG. 22, the management information output section 116 outputs the first difference information with the same contents as those of the piece of difference information with an "item number" of "1" in the difference information 131 in FIG. 17. The management information output section 116, for example, outputs the contents of the modification information 132 estimated in S32 as the "management modification information" as depicted in FIG. 24.

In this regard, in associating the first difference information output as depicted in FIG. 24 and the modification information 132 with each other and setting the resultant information in the difference information 131 as new difference information, the information administering section 112 sets duplicate information in the difference information 131.

Thus, as depicted in FIG. 25, the difference information 131 may have, as an item, the "number of times" indicative of the number of times that each managing operation has been modified. That is, in setting new difference information as the difference information 131, the information administering section 112 sets "1" in the "number of times". When the need arises to set information with the same contents as those of the pieces of difference information previously set in the difference information 131, the information administering section 112 increments the "number of times" in the previously set difference information by one. Specifically, when the management information depicted in FIG. 24 is output, the information administering section 112 sets "2" in the "number of times" in the first row of difference information in the difference information 131, as depicted in FIG. 25. Thus, the information administering section 112 can update the difference information 131 without generating duplicate information.

Process in S25 Executed When the Influence Information is Used

Now, a process in S25 will be described which is executed when the similarity is calculated using the influence information 135. The influence information 135 is, for example, information indicative of the influence for each piece of the comparison information when the contents of the managing operations are determined. The influence information 135 may, for example, be predetermined by the manager. Description will be given below with reference to FIG. 18.

FIG. 26 is a diagram illustrating a specific example of the influence information 135. The influence information 135 depicted in FIG. 26 has influence information for each piece of the comparison information included in the difference information 131. Specifically, in the influence information 135 in FIG. 26, for example, "0.2" is set as the influence information on the "platform software", and "0.9" is set as the influence information on the "source code". That is, the influence information 135 depicted in FIG. 26 indicates that a modification of the platform software has more influence on the managing operations than a modification of the source code. Thus, in the process in S25, the similarity calculating section 114 calculates the similarity taking the influence information 135 to enable more reliable modification information 132 to the manager. Description of the other pieces of information in FIG. 26 is omitted.

In S25 in FIG. 7, the similarity calculating section 114 calculates the sum of all the pieces of influence information included in the influence information 135. Specifically, in the example illustrated in FIG. 26, the similarity calculating section 114, for example, calculates the sum of "0.2", "0.5", "0.3", "0.9", 0.8", "0.5", "0.3", and "0.3" to be "3.8".

Then, the similarity calculating section 114 extracts, from the comparison result information in the first difference information, pieces of comparison result information with the same contents as those of the comparison result information in corresponding pieces of the difference information included in the difference information 131. Specifically, in the example illustrated in FIG. 18, the similarity calculating section 114 extracts the "platform software", the "source code", and the "test code" from the comparison result information in the first difference information as pieces of comparison result information with the same contents as those of the comparison result information in corresponding pieces of difference information included in the difference information 131.

Subsequently, the similarity calculating section 114 calculates the sum of the pieces of influence information corresponding to the extracted pieces of comparison information. Specifically, the in the example illustrated in FIG. 26, the similarity calculating section 114 calculates the sum of "0.2", corresponding to the influence information on the "platform software", "0.9", corresponding to the influence information on the "source code", and "0.8", corresponding to the influence information on the "test code" to be "1.9".

Subsequently, the similarity calculating section 114 calculates the similarity by dividing the sum of all the pieces of influence information included in the influence information 135 by the sum of the pieces of influence information corresponding to the comparison information with the same contents. Specifically, in the example illustrated in FIG. 26, the similarity calculating section 114 calculates the similarity to be "0.5", which results from division of "1.9" by "3.8".

[Process of Determining the Influence Information]

Figure 27:
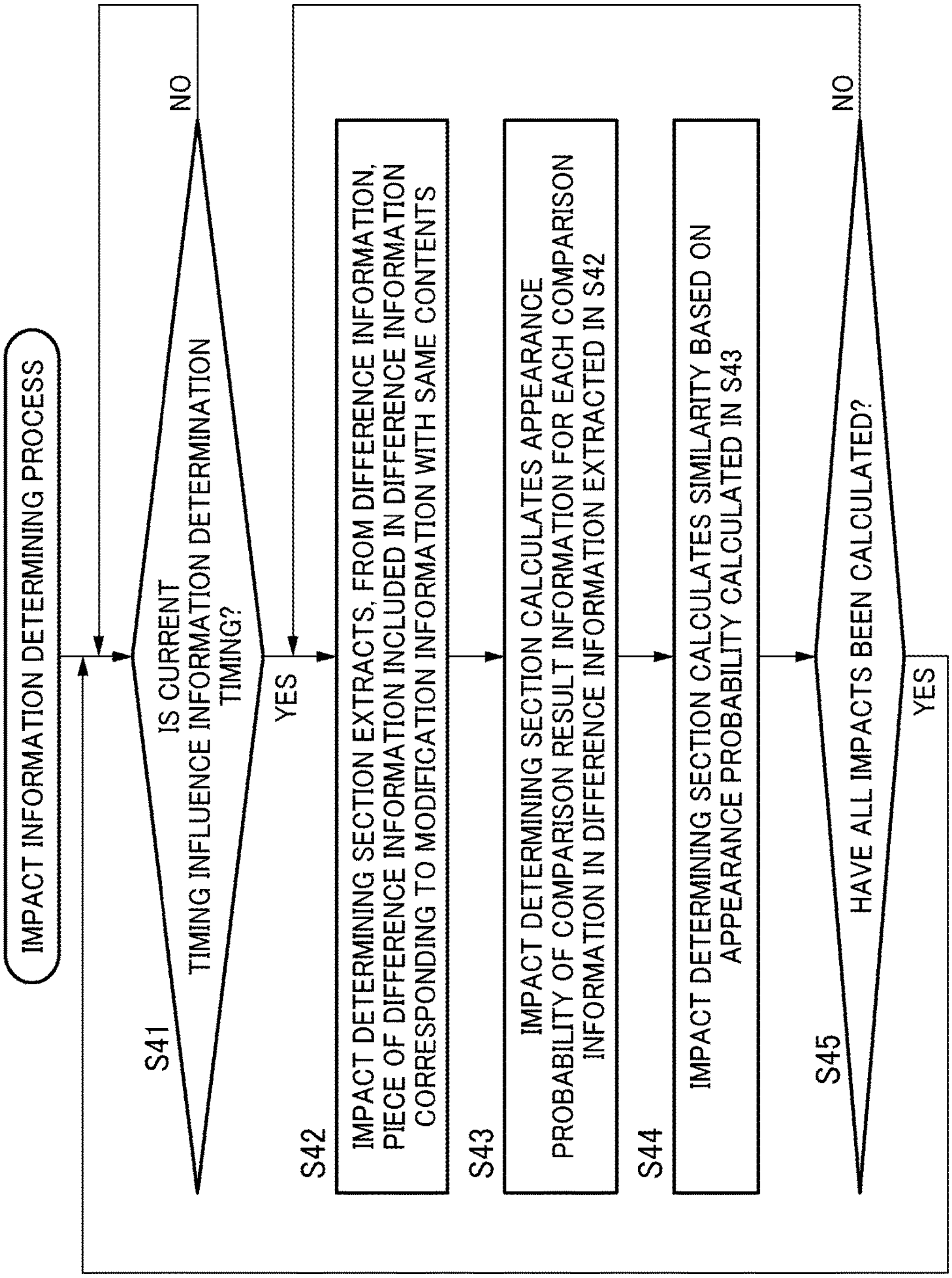
FIG. 27 is a flowchart illustrating the influence determining process.

Now, a process of determining the influence information 135 (hereinafter also referred to as an influence determining process) will be described. FIG. 27 is a flowchart illustrating the influence determining process. FIG. 28 and FIG. 29 are diagrams illustrating the influence determining process. With reference to FIG. 28 and FIG. 29, the influence determining process in FIG. 27 will be described.

The influence determining section 117, for example, waits until an influence information determination timing (NO in S41). The influence information determination timing may be, for example, a timing when, in S34 in FIG. 8, the information administering section 112 associates the first difference information with the modification information 132 to set the resultant information to be the difference information 131. Consequently, when the difference information 131 is updated, the influence determining section 117 can immediately calculate the influence information 135 reflecting the contents of the update. Thus, when the application is subsequently updated, the relevant-information providing apparatus 1 uses the influence information 135 reflecting the contents of the last update of the application to enable creation of management information provided to the manager.

Then, at the influence determination timing (YES in S41), the influence determining section 117, for example, extracts, from the difference information 131, pieces of difference information included in the difference information 131 corresponding to pieces of modification information 132 with the same contents (S42). A specific example of the process in S42 will be described.

FIG. 28 and FIG. 29 are diagrams illustrating a specific example of the difference information 131. In the piece of difference information with an "item number" of "1" in the difference information 131 depicted in FIG. 28, "4" is set as the "modification information". Also in pieces of difference information with "item numbers" of "4", "5", and "6", "4" is set as the "modification information". Thus, in this case, the influence determining section 117, for example, extracts pieces of difference information with "item numbers" of "1", "4", "5", and "6" from the difference information 131 depicted in FIG. 28, as depicted in FIG. 29. Description of the other pieces of information in FIG. 28 is omitted.

As seen back in FIG. 27, the influence determining section 117, for example, calculates the appearance probability of each of the pieces of comparison result information in the pieces of difference information extracted in S42 (S43). A specific example of the process in S43 will be described below.

In the "platform software" in the extracted difference information depicted in FIG. 29, "Apache" and "nginX" are each set at two points. Thus, in this case, the influence determining section 117 calculates each of the appearance probabilities of "Apache" and "nginx" to be "0.5". Consequently, in determining the modification information 132, the similarity calculating section 114 can reduce the value of the influence information for comparison result information with less impact. Thus, the relevant-information providing apparatus 1 can provide more reliable modification information 132 to the manager.

As seen back in FIG. 27, the influence determining section 117, for example, calculates the similarity based on the appearance probability calculated in S43 (S44). Specifically, the influence determining section 117, for example, calculates the sum of the appearance probabilities corresponding to the respective pieces of comparison result information, included in the first difference information, including contents equal to contents the pieces of comparison result information in the piece of difference information included in the difference information 131. The influence determining section 117 calculates the similarity by, for example, dividing the sum of the calculated appearance probabilities by the sum of the appearance probabilities corresponding to the respective pieces of comparison result information in the piece of difference information included in the difference information 131. A specific example of the process in S44 will be described below.

FIG. 30 is a diagram illustrating a specific example of the influence information. The influence information 135 depicted in FIG. 30 is influence information corresponding to a piece of difference information with a "modification information" of "4" in the difference information 131 (a piece of difference information corresponding to the setting file backup addition). In the influence information 135 depicted in FIG. 30, the comparison information such as the "platform software", the comparison result information and influence information are set such that the comparison information is associated with the comparison result information and the influence information. The influence information 135 depicted in FIG. 30 may be present for each piece of information set in the modification information 132.

Specifically, the influence determining section 117 sets "Apache" and "0.5", which is the influence information on "Apache", in association with each other as information on the "platform software", as depicted in FIG. 30. The influence determining section 117 sets "nginX" and "0.5", which is the influence information on "nginX", in association with each other as information on the "platform software", as depicted in FIG. 30. Description of the other pieces of information in FIG. 30 is omitted. A specific example will be described below in which the influence information 135 depicted in FIG. 30 is used to calculate the similarity between the first difference information in FIG. 16 and the piece of difference information with an "item number" of "1" in the difference information 131 in FIG. 28.

In the first difference information depicted in FIG. 16, "Apache" is set as the "platform software", "PHP" is set as the "language", "MySQL" is set as the "DB software", and "UPDATE" is set as the "source code". Furthermore, in the first difference information, "UPDATE" is set as the "test code", "UPDATE" is set as the "test data", "UPDATE" is set as the "document", and "UPDATE" is set as the "DB".

On the other hand, in the piece of difference information with an "item number" of "1" in the difference information 131 in FIG. 28, the first difference information depicted in FIG. 16, "Apache" is set as the "platform software", "Ruby" is set as the "language", and "UPDATE" is set as the "source code". Furthermore, in this piece of difference information, "UPDATE" is set as the "test code", "ADD" is set as the "test data", and "ADD" is set as the "document". The "DB software" and the "DB" are left blank.

Then, the similarity calculating section 114 acquires the influence information 135 corresponding to the setting file backup addition in the modification information 132. That is, the similarity calculating section 114 acquires the influence information 135 depicted in FIG. 30.

The similarity calculating section 114 extracts the influence information corresponding to the comparison information on the first difference information depicted in FIG. 16. Specifically, in the first difference information depicted in FIG. 16, the comparison result information corresponding to the "platform software" is "Apache". Thus, the similarity calculating section 114 extracts "0.5" from the influence information 135 depicted in FIG. 30, as the influence information corresponding to the "platform software". Similarly, the similarity calculating section 114 extracts "0.25", "0.25", "1", "1", "0.25", "0.25", and "0.25" as the pieces of influence information corresponding to the "language", the "DB software", the "source code", the "test code", the "test data", the "document", and the "DB", respectively.

Subsequently, the similarity calculating section 114 calculates the sum of the extracted pieces of influence information. Specifically, the similarity calculating section 114 calculates the sum to be "3.75" for the first difference information depicted in FIG. 16.

Then, the similarity calculating section 114 identifies the pieces of comparison result information, in the comparison result information included in the first difference information, including contents equal to contents of the pieces of comparison information included in the piece of difference information included in the difference information 131. Subsequently, the similarity calculating section 114 extracts influence information corresponding to the identified pieces of comparison information. Specifically, the similarity calculating section 114 identifies the “platform software”, the “source code”, and the “test code” as pieces of comparison information, in the comparison result information included in the first difference information in FIG. 16, including contents equal to contents of the pieces of comparison information included in the piece of difference information with an “item number” of “1” in the difference information 131 in FIG. 28. The similarity calculating section 114 calculates the sum of “0.5”, “1”, and “1”, which are the pieces of influence information on the “platform software”, the “source code”, and the “test code”, to be “2.5”.

The similarity calculating section 114 then calculates the similarity to be “0.67 (two significant figures)” by dividing “2.5”, the sum of the pieces of influence information on the “platform software”, the “source code”, and the “test code”, by “3.75”, the sum of the pieces of influence information corresponding to all the pieces of comparison information in the first difference information (S25 in FIG. 7).

As seen back in FIG. 27, the influence determining section 117, for example, determines whether or not the similarity has been calculated for all the pieces of difference information included in the difference information 131 (S45). When the calculation of all the similarities has been completed (YES in S45), the influence determining section 117 waits until the next influence information determination timing (S41). On the other hand, when the calculation of all the similarities has not been completed (NO in S45), the influence determining section 117 executes the process in S42 and the subsequent steps.

According to the first embodiment, in response to update of an application, the relevant-information providing apparatus 1 acquires the difference information 131, which is the difference between information on the non-updated application and information on the updated application, as described above. The relevant-information providing apparatus 1 then stores the difference information 131 and the modification information 132 on modifications resulting from the update of the application in the storage section 14 such that the difference information 131 and the modification information 132 are associated with each other.

In response to update of a first application, the relevant-information providing apparatus 1 acquires first difference information that is the difference between information on the non-updated first application and information on the updated first application. The relevant-information providing apparatus 1 then extracts, from the difference information 131, a piece of difference information that is in a predetermined similarity relation with the first difference information. Subsequently, the relevant-information providing apparatus 1 outputs a piece of the modification information 132 corresponding to the extracted piece of difference information. Thus, the relevant-information providing apparatus 1 can provide information on managing operations to be modified as a result of a release of a new application.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relevant-information providing method comprising:

every time an application is updated on a system, accumulating, by a processor, in a storage, information in which difference information including a plurality of pieces of comparison result information indicating whether each of the plurality of pieces of comparison information has been modified and modification information on management of the system modified as a result of an update of the application are associated with each other, as information on an update of the application performed in the past;

in response to acquisition of update information on a first application, comparing, by a processor, first difference information that is a difference between information on the first application that has not been updated and information on the first application that has been updated with each of the plurality of pieces of the different information accumulated in the storage;

calculating, by a processor, an appearance probability of each of the plurality of pieces of the comparison result information for each of the plurality of pieces of the modification information and for each of the plurality of pieces of the comparison information in the difference information stored in the storage;

calculating, by the processor, for each of the plurality of pieces of the difference information accumulated in the storage, a value resulting from division of a sum of the appearance probabilities corresponding to a piece of the modification information associated with each piece of the difference information and corresponding to each of the plurality of pieces of the comparison result information included in each piece of the difference information, which the plurality of pieces of the comparison result information include contents equal to contents of the comparison result information included in each piece of the difference information, by a sum of the appearance probabilities corresponding to a piece of the modification information associated with each piece of the difference information and corresponding to each of the plurality of pieces of the comparison result information included in each piece of the difference information;

determining, by the processor, whether or not the piece of the difference information of which the calculated ratio is equal to or higher than a threshold in the difference information accumulated in the storage;

when there is the piece of the difference information of which the calculated ratio is equal to or higher than the threshold, specifying, by the processor, the piece of the modification information corresponding to the piece of the difference information of which the calculated ratio is equal to or higher than the threshold among the modification information accumulated in the storage as the piece of the modification information accompanying update of the first application and outputting, by the processor, the piece of the modification information of which the calculated ratio is equal to or higher than the threshold without reviewing entire range of the management that may be influenced by update of the first application; and when there is not the piece of the difference information of which the calculated ratio is equal to or higher than the threshold, accumulating, by the processor, in the storage, information in which the first difference information and the modification information on management of the system modified as a result of an update of the first application are associated with each other.

2. The relevant-information providing method according to claim 1, further comprising, when the plurality of pieces of difference information stored in the storage includes no piece of difference information including a content equal to a content in the first difference information, storing, by the processor, in the storage, information including the first difference information and the modification information corresponding to the first application, the first difference information and the modification information being associated with each other.

3. A relevant-information providing apparatus comprising:

a storage that, every time an application is updated on a system, accumulates therein information in which difference information including a plurality of pieces of comparison result information indicating whether each of the plurality of pieces of comparison information has been modified and modification information on management of the system modified as a result of an update of the application are associated with each other, as information on an update of the application performed in the past; and a processor that, in response to acquisition of update information on a first application, compares first difference information that is a difference between information on the first application that has not been updated and information on the first application that has been updated with each of the plurality of pieces of the different information accumulated in the storage, calculates an appearance probability of each of the plurality of pieces of the comparison result information for each of the plurality of pieces of the modification information and for each of the plurality of pieces of the comparison information in the difference information stored in the storage, calculates for each of the plurality of pieces of the difference information accumulated in the storage, a value resulting from division of a sum of the appearance probabilities corresponding to a piece of the modification information associated with each piece of the difference information and corresponding to each of the plurality of pieces of the comparison result information included in each piece of the difference information, which the plurality of pieces of the comparison result information include contents equal to contents of the comparison result information included in each piece of the difference information, by a sum of the appearance probabilities corresponding to a piece of the modification information associated with each piece of the difference information and corresponding to each of the plurality of pieces of the comparison result information included in each piece of the difference information, determines whether or not the piece of the difference information of which the calculated ratio is equal to or higher than a threshold in the difference information accumulated in the storage, when there is the piece of the difference information of which the calculated ratio is equal to or higher than the threshold, specifies the piece of the modification information corresponding to the piece of the difference information of which the calculated ratio is equal to or higher than the threshold among the modification information accumulated in the storage as the piece of the modification information accompanying update of the first application and outputs the piece of the modification information of which the calculated ratio is equal to or higher than the threshold without reviewing entire range of the management that may be influenced by update of the first application, and when there is not the piece of the difference information of which the calculated ratio is equal to or higher than the threshold, accumulates, in the storage, information in which the first difference information and the modification information on management of the system modified as a result of an update of the first application are associated with each other.

4. A non-transitory computer-readable storage medium storing therein a relevant-information providing program for causing a computer to execute a process comprising:

every time an application is updated on a system, accumulating, in a storage, information in which difference information including a plurality of pieces of comparison result information indicating whether each of the plurality of pieces of comparison information has been modified and modification information on management of the system modified as a result of an update of the application are associated with each other, as information on an update of the application performed in the past;

in response to acquisition of update information on a first application, comparing first difference information that is a difference between information on the first application that has not been updated and information on the first application that has been updated with each of the plurality of pieces of the different information accumulated in the storage;

calculating an appearance probability of each of the plurality of pieces of the comparison result information for each of the plurality of pieces of the modification information and for each of the plurality of pieces of the comparison information in the difference information stored in the storage;

calculating for each of the plurality of pieces of the difference information accumulated in the storage, a value resulting from division of a sum of the appearance probabilities corresponding to a piece of the modification information associated with each piece of the difference information and corresponding to each of the plurality of pieces of the comparison result information included in each piece of the difference information, which the plurality of pieces of the comparison result information include contents equal to contents of the comparison result information included in each piece of the difference information, by a sum of the appearance probabilities corresponding to a piece of the modification information associated with each piece of the difference information and corresponding to each of the plurality of pieces of the comparison result information included in each piece of the difference information;

determining whether or not the piece of the difference information of which the calculated ratio is equal to or higher than a threshold in the difference information accumulated in the storage;

when there is the piece of the difference information of which the calculated ratio is equal to or higher than the threshold, specifying, by a processor, the piece of the modification information corresponding to the piece of the difference information of which the calculated ratio is equal to or higher than the threshold among the modification information accumulated in the storage as the piece of the modification information accompanying update of the first application and outputting the piece of the modification information of which the calculated ratio is equal to or higher than the threshold without reviewing entire range of the management that may be influenced by update of the first application; and when there is not the piece of the difference information of which the calculated ratio is equal to or higher than the threshold, accumulating, in the storage, information in which the first difference information and the modification information on management of the system modified as a result of an update of the first application are associated with each other.

* * * * *